(12) United States Patent
Moore

(10) Patent No.: US 6,979,717 B2
(45) Date of Patent: Dec. 27, 2005

(54) ANIONIC PROCESS DESIGN FOR RAPID POLYMERIZATION OF POLYSTYRENE WITHOUT GEL FORMATION AND PRODUCT PRODUCED THERE FROM

(76) Inventor: Eugene R. Moore, 5600 Woodview Pass, Midland, MI (US) 48642

(*) Notice: Subject to any disclaimer, the term of this patent is extended or adjusted under 35 U.S.C. 154(b) by 0 days.

(21) Appl. No.: 10/215,406

(22) Filed: Aug. 8, 2002

(65) Prior Publication Data

US 2003/0073792 A1 Apr. 17, 2003

Related U.S. Application Data

(60) Provisional application No. 60/311,662, filed on Aug. 13, 2001.

(51) Int. Cl.[7] .................. C08F 112/08; C08F 2/02
(52) U.S. Cl. .................. 526/346; 526/63; 526/65; 526/73; 526/173
(58) Field of Search .................. 526/346, 63, 65, 526/73, 173

(56) References Cited

U.S. PATENT DOCUMENTS

| | | | |
|---|---|---|---|
| 3,812,088 A | * | 5/1974 | Bennett .................. 526/346 |
| 4,046,718 A | | 9/1977 | Mass et al. |
| 4,200,213 A | | 4/1980 | Liesse |
| 4,230,835 A | * | 10/1980 | Weil .................. 525/316 |
| 4,252,925 A | | 2/1981 | Fukuda et al. |
| 4,389,517 A | | 6/1983 | Priddy et al. |
| 4,572,819 A | | 2/1986 | Priddy et al. |
| 4,647,632 A | | 3/1987 | Priddy |
| 4,725,654 A | | 2/1988 | Priddy et al. |
| 4,748,222 A | | 5/1988 | Malanga |
| 4,822,936 A | | 4/1989 | Maurer et al. |
| 4,883,846 A | * | 11/1989 | Moore et al. .................. 526/73 |
| 4,942,209 A | | 7/1990 | Gunesin |
| 5,064,918 A | | 11/1991 | Malanga |
| 5,391,655 A | | 2/1995 | Brandstetter et al. |
| 5,587,438 A | | 12/1996 | Binsbergen et al. |
| 5,602,216 A | | 2/1997 | Juvet |
| 5,717,040 A | | 2/1998 | Brandstetter et al. |
| 5,902,865 A | | 5/1999 | Gausepohl et al. |
| 5,990,236 A | | 11/1999 | Knoll et al. |

FOREIGN PATENT DOCUMENTS

| | | | |
|---|---|---|---|
| DE | 4443752 | | 12/1997 |
| GB | 1139267 | * | 1/1969 |
| JP | 97249705 A | | 9/1997 |
| WO | WO 96/1864 | | 6/1996 |
| WO | WO 97/01585 | | 1/1997 |
| WO | WO 98/07765 | | 2/1998 |
| WO | WO 01/36494 | | 5/2001 |

OTHER PUBLICATIONS

Schwarc, M., Progress in Reaction Kineticss, p. 218–284, Vo. 2, Portere, G., ed Pergamon Press, Macmillan, N.Y., 1964, Relevant pages are: P 244 & P 254.
Worsfold, D. J., et al, Can. J. Chem., V 38, #10, 1960, Relevant pages are: P 1896.
Roovers, J. E. L., et al, Macromolecules, V 8, # 3, May–Jun. 1975, Relevant pages are: P 252.
Morton, M., et al, J of Poly. Sci. Part A, V1, P 461–474, 1963, Relevant pages are: P 464.
Schwartz, M., Carbanions, etc., Wiley–Interscience, N.Y. 1968, Relevant pages are: P 9, 16, 19.
Moore, E. R., ED, Styrene Polymers Section, Ency. Poly. Sci. & Eng., V 16 P 1–246, John Wiley & Sons 1989, Relevant pages are: P 7, 30, 31, 76–77.
Crowder, M. I., et al, Poly Eng. & Sci., Mid Oct 1994, V 34, #19, p 1497, Relevant pages are: P 1503, 1504.
Kim, Dong–Min, et al, Ind. Eng. Chem. Res. 38, #5, 1856–1862, 1999, Relevant pages are: P 1861.
Anon., Research Disclosure, "Star Branched Polymers etc." 1990, Relevant pages are: P 276.
Moore, E. R. "Significance of the Gel Point etc.", PhD Thesis, Case West. Res. U., 1962, Relevant pages are: P 35.
Hirao, A., et al, Macromolecules, V. 26, #9 , Apr. 26, 1993, Relevant pages are: P 2148, 2149.
Priddy et al, JAPS, 40, 41–45 1990, Relevant pages are: P 41, 44–45.
Kern, W. J., et al, JAPS, V 16, # 12, P 23–3131, 1972, Relevant pages are: P 3128, 3130.
Kern, W. J., Preprint, Div of Poly. Chem, ACS, V 12, # 1, 1971, Relevant pages are: P 453.
Quirk, Roderic P., et al, Macromolecules, V 22, 85–90, 1989, Relevant pages are: P 85.
Morton, M., et al, JAPS, Part C, #1, 311–323, 1963, Relevant pages are: P 312.
Welch, F. J., J. Am. Chem. Soc., v 81, p1345, 1959, Relevant pages are: P 1345.
Worsfold, et al, Macromolecules, V 5, #4, p393, Jul.–Aug. 1972, Relevant pages are: P 393 +.
Kim, H. J., et al, Korean Polymer Journal, V 7, # 1, 64–71, 1999, Relevant pages are: P 64, 69.
Chemetall Informational Brochure, Handling butyllithium, Relevant pages are: P 18.
Roper, A. N., et al, Br. Polym. J., V. 7, 195–203, 1975, Relevant pages are: P 195–203.

* cited by examiner

Primary Examiner—Fred Teskin

(57) ABSTRACT

The extremely rapid anionic polymerization rate of polystyrene has made polymerization difficult to control and has prevented large-scale development. This invention uses batch polymerization to utilize the rapid rate of polymerization to complete polymerization from zero to 100% conversion in minutes and turns this rapid rate into an advantage. Polystyrene itself is used as a heat sink to limit and control the maximum temperature reached during polymerization. Adiabatic polymerization increases the polymer temperature to the desired processing temperature of the polymer for either removal of volatile compounds or for direct pellet formation when no solvent is employed. The polystyrene to be used as a heat sink is added either as pellets or is first formed at a low controllable temperature. Extremely low levels of residual monomer are found in the product. This invention also demonstrates techniques to prevent gel formation or to reduce formation to an acceptable level.

28 Claims, 9 Drawing Sheets

CHEMISTRY

Initiation (with Normal Butyl Lithium)

Propagation

Termination with Methanol

Termination with Water

CHEMISTRY

Termination with Carbon Dioxide

Termination with Ethylene Oxide

Figure 1:
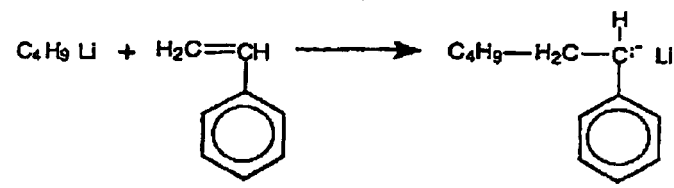
Figure 1:
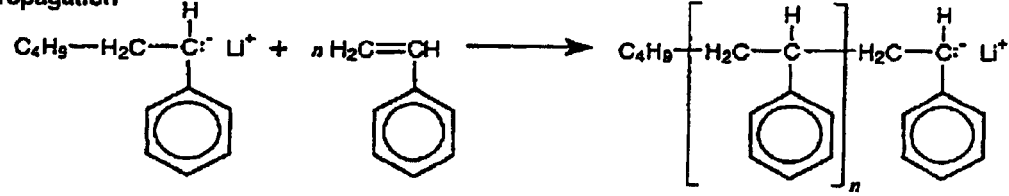
Figure 1:
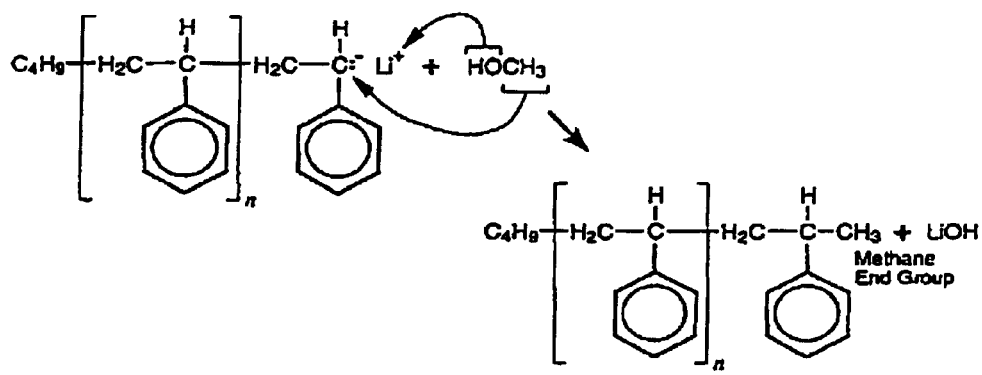
Figure 1:
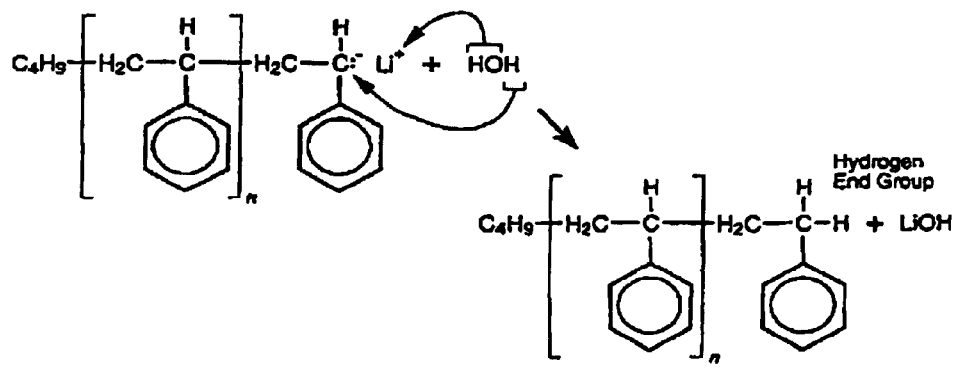
Figure 1:
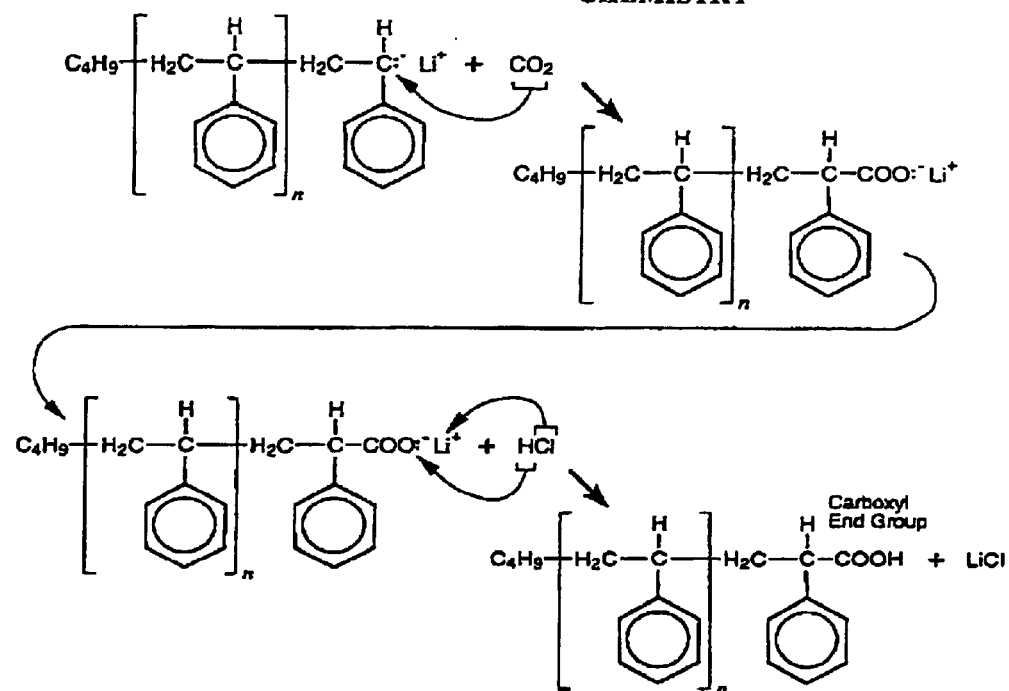
Figure 1:
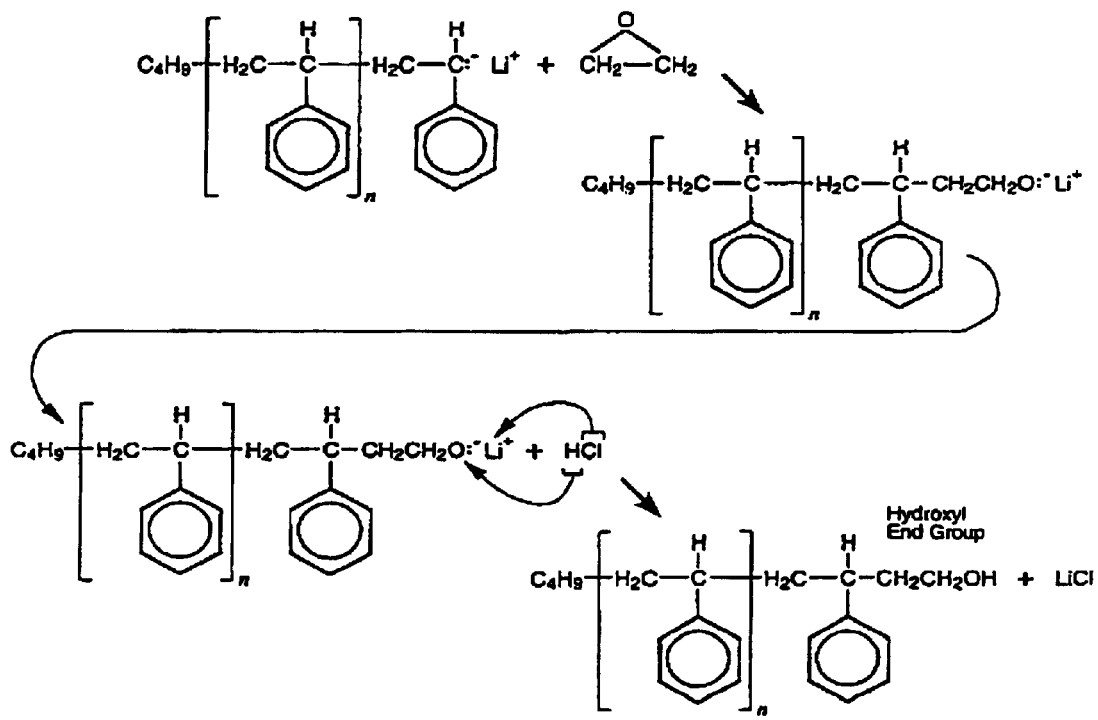

Figure 1 (Concluded)
CHEMISTRY
Termination with Epichlorohydrin
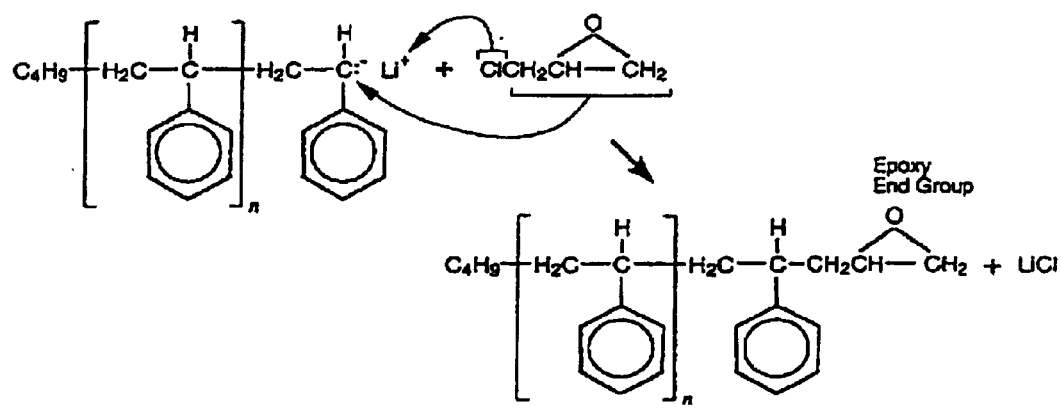
Termination with Heat
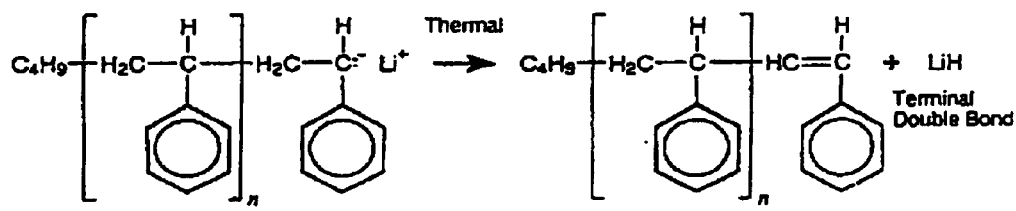

ADIABATIC POLYMERIZATION VIA THE SINGLE PASS TUBULAR ROUTE
(US 5717040)

ADIABATIC FINISHING RECIRCULATING REACTOR
(US 5902865)

ADIABATIC POLYMERIZATION REACTORS IN SERIES
(US 5391655)

BOILING TUBULAR REACTOR POLYMERIZATION
(US 4200713)

BOILING CSTR POLYMERIZATION
(US 4725654)

COUNTER CURRENT SPRAY TOWER POLYMERIZATION
(US 5587428)

(Residence Time = Approximately 10 sec.)

STATIC MIXER POLYMERIZATION
(US 5602216)

BOLUS FLOW

ANIONIC POLYSTYRENE

BLOCK FLOW DIAGRAM FOR ANIONIC POLYMERIZATION TO PRODUCE POLYSTYRENE

ANIONIC PROCESS DESIGN FOR RAPID POLYMERIZATION OF POLYSTYRENE WITHOUT GEL FORMATION AND PRODUCT PRODUCED THERE FROM

FIELD OF INVENTION

This invention relates to an improved process for producing polystyrene by anionic polymerization and the improved gel free product resulting there from. This application claims the benefit of U.S. Provisional Patent Application Ser. No. 60/311,662 filed Aug. 13, 2001, which is incorporated herein by reference.

BACKGROUND OF INVENTION

The most common mode of polymerization of commercial grades of polystyrene utilizes free radicals, and is thus called "free radical polymerisation". Anionic polymerisation has tremendous polymerisation rate advantages over free radical. In spite of this rate advantage, however, anionic polymerisation has been utilized commercially only in limited areas, generally not involving polystyrene. Most of the useful areas have involved copolymerisation to produce block copolymer type elastomers. The rapid rate of anionic polymerization has actually inhibited the commercial development for polystyrene, due to difficulty in removing heat fast enough to control the highly exothermic reaction. Several companies have explored and patented techniques for dealing with this rapid rate of polymerization.

Another very serious, but less discussed, problem is "gel" formation. Technology of dealing with both the rapid rate of polymerisation and gel formation is key to commercialisation of anionic polystyrene and both are contained in this patent.

Anionic Advantages
Rapid Polymerization Rate

The actual rate of growth of any single polymer chain by anionic polymerization is only slightly faster than by free radical polymerization. The overall anionic polymerization rate is, however, four to six orders of magnitude ($10^4$ to $10^6$) faster than free radical polymerization (ref #6). This difference is due to the fact that the typical concentration of free radicals [M*] is very low (only about $10^{-8}$ to $10^{-7}$ M), whereas the concentration of propagating anions [M–] is very much higher (may be as much as $10^{-3}$ to $10^{-2}$). This is due to the fact that the propagating anions are not terminated during normal polymerization (giving rise to the term "living polymer"), while the free radicals have a very short life span. In a polymerization system that has pure styrene (all polar compounds removed), each anion results in one growing chain. These propagating anions are only terminated by reaction with polar compounds such as water, methanol, carbon dioxide, etc. The presence of the living styryl anions can be observed by their intense color, which is directly proportional to their concentration. If a glass tube containing a solution of living styril anions is carefully sealed the intensity of the color will not change even after many years. Some of the early work, which demonstrates the living nature of the polystyrene anion, has been summarized by Szwarc (ref #5).

A 1997 Asahi patent publication (JP 97249705A) used a technique to slow this reaction. They found that certain nitrogen compounds, such as pyridine, would slow anionic polymerisation to the point that it was more easily controlled. They, surprisingly, did this while still maintained a narrow molecular weight distribution. They claim to have demonstrated polystyrene with Mw/Mn as low as 1.12 and Mw=207,000 (this Mw is typical of commercial injection molding grade resins).

Use of Inexpensive By-product Styrene

The rapid polymerisation rate with anionic initiation has resulted in the ability to utilize monomer sources that could not be utilized by free radical processes. In U.S. Pat. No. 4,389,517 Dow, for example, has shown the ability to utilize an impure stream containing styrene and xylene (called pyrolysis gasoline). Pyrolysis gasoline is a petroleum by-product stream in which styrene monomer is normally hydrogenated in order to allow cracking (the presence of styrene monomer fouls cracking catalyst). Dow has shown that styrene in this stream can be concentrated to about 50 wt % by distillation and then completely anionically polymerised. This process produced a molding grade polystyrene product. In addition, by removing all of the styrene monomer from this stream, the remaining xylene was suitable for cracking without the necessity of hydrogenation to remove the catalyst-fouling styrene.

Styrene Polymerized Entirely from Ethylbenzene Cracker Effluent

Currently, the most common process for preparation of styrene monomer involves the partial cracking of ethylbenzene. This process produces a mixture of styrene and ethylbenzene that must currently be separated by a difficult distillation in order to produce polymerisation grade styrene (usually <0.2% ethylbenzene). This separation is among the most difficult industrial distillations and there is a big incentive to avoid that step if possible. In two Dow patents it was shown possible to eliminate the need to separate ethylbenzene from styrene monomer before polymerisation (U.S. Pat. Nos. 4,572,819, 4,725,6564). The rapid anionic rate allowed polymers to be produced from the crude ethylbenzene/styrene mixtures leaving a pure ethylbenzene stream to be returned to the cracker. While this approach was a complete technical success the logistics of shipping large amounts of ethylbenzene have apparently hampered commercial success.

Feed Cleanliness Requirements

There are two major processing differences between free radical polymerization and anionic polymerization of styrene: 1) rapid anionic polymerization rates (which were discussed above), and 2) the anionic monomer cleanliness requirement. The organo-metallic catalysts employed in anionic polymerization react with a wide variety of trace polar compounds present in commercial grade styrene monomer (water, oxygen, acetophenone, benzaldehyde, styrene oxide, tertiarybutylcatechol (polymerisation inhibitor), and about 50 other minor compounds are reported in (ref #12). Some additional purification steps are, therefore, required in order to reduce the amount of anionic initiator required. While these purification techniques (which will be discussed later) are not difficult they do require additional capital and unit operations that are not necessary for free radical polymerization. In addition, the clean feed requirement increases the difficulty of doing trial runs in existing commercial polystyrene plants, which will not have the necessary cleaning equipment.

Low Residual Monomer Remains in Polymer

For food contact applications it is desirable to have an exceptionally low residual monomer content in order to avoid transfer of taste and/or odor to the food. While styrene monomer presents no short or long term toxicity problems, there is a characteristic taste and odor that is transferred to some foods stored in polystyrene containers. This is particularly true for containers to be use for high fat content foods such as chocolates.

Common commercial polystyrene has a residual styrene content of 500–700 ppm by weight. Use of higher than normal vacuum during devolatilization requires refrigerated condensation but can produce levels as low as 200–300 ppm. The injection of a stripping agent prior to a second stage of devolatilization can obtain levels as low as 100 ppm. Anionic polymerization, in batch or plug flow reactor systems, may give levels of 10–20 ppm and has the theoretical capability of levels below 1 ppm. Dow has reported (U.S. Pat. No. 4,883,846) a level below 10 ppm (10 ppm appears to have been the detection limit). This anionic polymerization was carried out with 33 wt % styrene in ethylbenzene in a commercial size, boiling, batch reactor followed by a two stage devolatilization. The heat of reaction supplied the heat of vaporization, which was then removed in a "reflux" condenser. BASF also reported levels below 10 ppm (WO 98/07765) in a 29.7 mm diameter tubular reactor (residence time 7.9 min), below 5 ppm (WO 97/01585) in a smaller 2 mm diameter tubular reactor (residence time 1.4 min), below 5 ppm in a rubber modified version (WO 01/36494) and of 8 ppm in another rubber modified version (U.S. Pat. No. 5,990,236). Low residual monomer content is another advantage that results from the very rapid anionic polymerization rate that causes virtually all monomer to be consumed.

In free radical polymerization a large amount of dimers and trimers are produced (commonly called oligomers). In some cases these oligomers act as internal plasticizers and are thought by some to be desirable as flow promoters. In some cases they reduce the amount of mineral oil plasticizer required to reach a particular melt viscosity. The addition of 1–2 wt % mineral oil to a high molecular weight extrusion grade polymer produces a polymer with the flow properties of a lower molecular weight molding grade resin. This mineral oil containing resin has been shown to produce a resin with a poorer balance of properties then the lower molecular weight resin without mineral oil added (ref #7). The addition of mineral oil does allow a more rapid change in resin grades than would be possible if the temperature profile of the polymerization train were to be changed. These low molecular weight oligomers act in a similar manner to the low molecular weight mineral oil and produce a polymer with a poorer balance of strength and processability when present.

In addition to damage to the balance of properties, oligomers decompose more easily than the higher molecular weight polymer. When this decomposition occurs during thermal processing to produce a formed part, they produce styrene monomer. As will be shown below styrene monomer is believed to be a source of taste and odor transfer to food in contact with the polymer.

The level of trimer and dimer in a typical commercial free radical polystyrene would be 500 ppm and 13000 ppm respectively. Using anionic polymerisation, Dow (U.S. Pat. No. 4,883,846) has reported much lower values for these oligomers (total dimer and trimer content of <300 ppm). In the first three examples of WO 98/07765, BASF found that dimer and trimer were below the detection limits. It has been noted that if one were to count the number of molecules of oligomer in commercial free radical polymers oligomer molecules would outnumber the polymer molecules.

Low High Taste and Odor Compounds Likely in Anionic Polystyrene

The conventional devolatilization of polystyrene involves significant residence time at high temperature and high vacuum. In commercial vacuum systems it is nearly impossible to eliminate the presence of very small vacuum leaks. These leaks introduce traces of oxygen under conditions of temperature that tend to promote oxidation of styrene monomer. There has been some discussion about the probability of low level production of aldehydes and ketones during this devolatilization period. Aldehydes and ketones are known to be extremely strong contributors to taste and odor in the chemical world and are the chief components of perfumes and many flavor elements. These aldehydes and ketones are believed to account for a significant amount of the taste and odor transfer that has been attributed to residual styrene monomer. The design proposed here requires a small fraction of the exposure time to high vacuum normally required for commercial free radical processes and has almost no residual styrene monomer to be oxidized. This reduced opportunity for oxidation is expected to greatly lower the content of aldehydes and ketones in the anionic polystyrene product.

I have not found any evidence in the literature that aldehyde and ketone content of commercial polystyrene has been explored. It is believed, however, that analytical technology now exist that could be adapted to quantitatively measure the ppb or ppt range of these taste and odor contributing compounds. This is a challenge to future researchers since the availability of techniques sensitive enough to measure these low levels would likely lead to improvements even in existing free radical devolatilization procedures.

No Recycle Stream Required for Anionic Polystyrene

When free radical polymerization is used a high percent of the monomer is unpolymerized (as high as 20–30 wt %). Economics require that this monomer be recycled. There is a capital cost associated with the handling of this recycle stream. There are also the problems associated with accumulated taste and odor forming impurities. Aldehydes and ketones, for example that are produced during devolatization partition between the polymer and the vapor. Thus they partially remain in the polymer and contribute to taste and odor problems related to the polymer. The volatilized portion, however, accumulates in the recycle. As the concentration continues to accumulate in the recycle, a correspondingly larger level of these undesired compounds remain in the polymer. In addition to the above capital reductions associated with elimination of monomer recycle, it is reasonable to predict that the taste and odor contribution of polystyrene produced by this anionic process will be markedly improved over the conventional free radical polystyrene.

Higher Purity of Recycle Ethyl Benzene

Recycle from the common free radical polymerization of styrene will always contain high levels of styrene monomer. The recycle from anionic polymerization in batch or plug flow reactor systems, will be extremely pure. This increased purity is also a result of the very rapid polymerization rate, which allows all styrene to be completely consumed in batch or plug flow reactor systems (and almost completely in continuous reactors). This complete conversion leaves only residual ethylbenzene (styrene produced by the most common process of cracking ethylbenzene has a few tenths of a percent remaining after distillation). In free radical polymerization this ethyl benzene accumulates in the high styrene content recycle and must be discarded. This discarded stream will generally contain 30 to 50 wt % styrene, presenting both a raw material loss and a waste disposal concern. The purity of the ethylbenzene from anionic recycle is such that it can be safely stored (no polymerization concerns) and returned to a styrene plant for conversion to styrene, when a full tank truck or rail car has accumulated.

If the oxidative process is used to produce styrene (and co-produce propylene oxide) ethylbenzene will not be present as an impurity in the monomer. The design of this invention requires a minimal devolatilization step to remove only the ethylbenzene impurity contained in the incoming styrene. With the use of the oxidation process that does not produce ethylbenzene, volatile removal after anionic polymerization may not even be necessary.

Temperature Effect on Molecular Weight

Temperature of free radical polymerization has a strong influence on molecular weight of the resulting polymer with higher temperature producing dramatically lower molecular weight. Temperature of anionic polymerization on the other hand has no perceptible effect on the molecular weight of the resulting polymer. The only minor effect known is due to thermal termination that will cause a small number of chains to be shorter because they are terminated while others continue to grow. In this design, the rate of propagation is so fast that thermal termination may be considered neglectable during the short time that monomer remains unconsumed. Molecular weight of anionic polymers is thus, for practical purposes, completely dependent on the concentration of the anionic initiator.

Living Polymer Drawbacks

The "immortality" of the styryl anions under propagation conditions accounts to the rapid rate of polymer formation and a number of other advantages discussed above. This same "good news" characteristic is also the "bad news" in most polymerization processes that have been described in the literature. This immortality appears to "doom" all continuous processes that I have found in the literature. In a continuous process there is always a slow moving layer near the wall that has a longer time to grow because of this slow movement. After the monomer in this slow layer is consumed, monomer from adjacent faster moving layers diffuse into this slow moving layer and add to the molecular weight of these immortal styryl anions. As the molecules grow longer the originally slow moving layer becomes more viscous and moves even slower.

This process continues until the wall layer is not moving at all but is still increasing in molecular weight. Higher solvent content or greater turbulence can slow the formation of this static layer but cannot stop its progression. As the build-up continues, the reactor will either plug completely or parts of the non-flowing layer will break loose of the wall and appear in the product as gels. High turbulence and low monomer content can be combined to minimize the thickness of the wall "coating" of this very high molecular weight material. The material removed from the walls will be much higher molecular weight than the mass of the polymer and will have a much higher melt viscosity. This viscosity difference will cause the high molecular weight material to appear as very undesirable irregularities or "gels" in any thermoforming operation, particularly those that involve high degrees of orientation. The appearance of these gels is not mentioned in many literature references. This may be due to the fact that research runs are often just a few hours and not long enough for the gels build up on the walls to the point that some is stripped off and begins to appear in the product. n other cases, the failure to mention gels that did appear may not have appeared important enough to mention. In at least two cases they have been discussed. In comparative example #2 of U.S. Pat. No. 4,725,654, large visible gels were reported after only 24 hours of continuous operation. This example used a particularly large surface to volume laboratory scale reactor that simulated a commercial stirred tube reactor (a class of stratified reactors). Rensselaer (ref #8) demonstrated the plugging in a tubular reactor and found material exceeding a molecular weight of one million on the walls. This high molecular weight material would eventually break off and become gels. The gel problem in tubular reactors was also described by Mass et al (U.S. Pat. No. 4,046,718) in 1977.

Chemistry

Initiation

The initiation of anionic polymerization of styrene involves the reaction of the highly purified monomer with one of a number of organometallic compounds. The organolithium compounds are the most often used (ref #3, #6) usually normal butyl lithium (NBL). If the styrene is sufficiently pure each molecule of lithium will initiate one chain. If impurities with active hydrogen atoms are present, each active hydrogen on the impurity will consume one molecule of lithium, thus reducing the number of polystyrene molecules initiated. Toyo Soda (U.S. Pat. No. 4,252,925) has reported the use of less expensive compounds (such as calcium hydride, benzophenone, and sodium) to react with these impurities to reduce the amount of NBL needed. As will be seen later, this design uses two unit operations (a vacuum flash followed by absorption on activated alumina) to provide a less costly clean up procedure. The simple initiation chemistry is shown in FIG. 1.

The initiation step creates the bright orange styryl anion. The intensity of the color is proportional to the concentration of the anions. This color will thus be proportional to, and predictive of the final molecular weight. The relationship between color and molecular weight is so good that Dow has used a color sensor in a "feed-back" molecular weight control technique (U.S. Pat. No. 4,572,819).

At low temperatures the initiation is much faster than propagation (6, U.S. Pat. No. 4,883,846). The activation energy for initiation has been reported to be 1.8 kcal/mol compared to 14.3 kcal/mol for propagation (ref #2). This fact is important when a narrow molecular weight distribution is desired. By starting at a low temperature initiation is complete before any significant amount of growth has taken place. As temperature is raised to a point where propagation takes place, all molecules begin to grow at the same time. Since the concentration of monomer is uniform, these molecules all grow to exactly the same length.

Both secondary and tertiary butyl lithium were shown to initiate polystyrene much faster than NBL (ref #3). Once initiated however propagation rates are identical and NBL has been generally preferred. NBL is now available commercially (From Albermarle or Chemetall Foote in the US). Some early researchers at the U. of Akron synthesized NBL by reaction of Li metal with di-n-butylmercury (ref #4). They also suggested producing it from n-butylbromide.

Propagation

Propagation proceeds by repeated insertion of a styrene molecule between the styryl anion and the Lithium counter ion. This chemistry is also shown in FIG. 1. Since the counter ion must move as the chain grows, it is intuitive that the atomic size of the counter ion has an influence on the propagation rate. The larger counter ions are the slowest in the following order with the atomic radius shown in angstroms: Li (1.52A), Na (1.86A), K (2.31A), Rb (2.44A), Cs (2.62A). The propagation rate with all of these counter-ions has a linear dependence on the concentration of living ends (ref #6). This linear dependence suggests complete parallel and independent propagation reactions for each individual growing chain.

Solvent Effect on Propagation Rate

Polymerization rates in even non-polar solvents are so fast that they may be termed "explosive". Propagation speeds, however, are highly dependent on the polarity of the solvent. It is even more extraordinary that polymerization rates in a polar solvent are very much faster than in non-polar solvents. The relative rate constants ($k_p$) of some typical solvents (at 25 C.) are as follows: benzene (2 L/mol-sec), dioxane (5 L/mol-sec), tetrahydrofuran (550 L/mol-sec), 1,2-dimethoxyethane (3800 L/mol-sec) (ref #6). Rates in benzene are assumed to be similar to the rate where styrene itself is the solvent since both are aromatic and non-polar.

Morton et al (ref #16) used an interesting technique to study the speed of the propagation step separately from the initiation step. They first produced a 5000 Mw living polymer "seed". Propagation could then be studied independently of initiation when additional styrene was added to this seed.

Welch (ref #17) examined the propagation rate of polystyrene in hydrocarbon solvents at several temperatures and determined that the activation energy for propagation is 17 kcal/mol. Worsfold et al (ref #18) have used early light scattering techniques to determine the molecular weight of the terminated versus the same living polymers in a nonpolar solvent. Worsfold's study showed that the living polymer had two times the molecular weight of the terminated polymer. This study confirmed the bimolecular association of polystyryllhium in hydrocarbon solvents. The steric hindrance involved with this association accounts for the relatively slow propagation rate in non-polar compared to polar solvents.

Chain Transfer Multiplies Effectiveness of NBL

In the past the cost of NBL has contributed greatly to the projected cost of anionic polystyrene. One means of reducing that cost is to remove impurities that wastefully consume NBL (as discussed above and referenced in (ref #12) Chain transfer to a solvent is another technique. Priddy et al (U.S. Pat. No. 4,647,632) has reported experiments demonstrating that ethylbenzene is a very effective chain transfer agent. A monomer content of about 50 wt % in ethylbenzene was anionically polymerised in a CSTR at temperatures of about 100° C. with a residence time of about two hours. An increase in NBL efficiency of about 500% (5 polystyrene molecules per NBL molecule added) was reported. This high efficiency was due to the very high ratio of ethylbenzene to styrene monomer (about 50 wt % ethylbenzene and less than 2 wt % styrene) and the relatively high temperature. The molecular weight distribution of the polymer was Mw/Mn= 2.0. When this chain transfer effect was combined with use of extremely pure feed, more than 50 mol of polystyrene were reported per mol of NBL. The extremely pure styrene feed stream was prepared by passing it through a bed of lithium aluminium hydride supported on ion exchange resin (ref #12).

This design does not utilize solvent, and will not take advantage of the chain transfer effect. Chain transfer is not extremely important in the high molecular weight molding grade resins, which use relatively small amounts of NBL. Chain transfer would become much more important in producing very low molecular weight polystyrene. Such resins may be useful for coatings applications, or for use as a raw material for additional chemical reactions, particularly if functionally terminated (as discussed below).

In (U.S. Pat. No. 4,748,222) Dow has shown that the amount of NBL required to produce alphamethylstyrene copolymers can be reduced to $\frac{1}{16}$ of the theoretical amount. This reduction was accomplished by the addition of potassium tertiary-amyl oxide as an "initiator activator". The chain transfer mechanism was not mentioned.

Termination

Almost any polar compound with active hydrogen groups can serve to terminate a living chain (ref #5) as shown in FIG. 1. Both methanol and water give a simple hydrocarbon end group. Methanol is usually the preferred of the two because of its greater solubility, which improves ease of mixing. Carboxyl end groups may be obtained when carbon dioxide is used and hydroxyl end groups may be obtained when ethylene oxide is used. I have chosen methanol for this design.

Thermal Termination

Thermal termination can take place with the production of lithium hydride. The process has been reported to be first order (ref #13, #14) with rate constants of at 65, 93, and 120° C. of 0.15/hr, 0.78/hr, and 1.3/hr respectively. Due to the relatively rapid rate of propagation compared to thermal termination there is no anticipated effect on the molecular weight distribution of the polystyrene polymer. All of the monomer will have been consumed before a significant amount of thermal termination can occur.

On the other hand thermal termination will be used, as discussed later, to avoid the fouling of reactor walls that occurs in all continuous processes and is a threat in all sequencing batch processes. The only continuous process that has a high probability of not either plugging or producing objectionable gels involves the "Bolus Flow" concept "(Agureq)".

Hydroxyl and Carboxyl termination

Both hydroxyl and carboxyl termination of polystyrene were demonstrated by Kim et al (ref #19). Hydroxyl groups were formed by termination with ethylene oxide while termination with carbon dioxide formed carboxyl groups. Quirk et al (ref #15) was first to develop a technique for obtaining near quantitative termination with carboxyl groups.

Quirk found that he could totally eliminate the dimer ketone and trimer alcohol by-products. He accomplished this by carbonation of freeze-dried (from a benzene solution) material where the active ends were complexed with one or two molecules of N,N,N',N'-tetraethylenediamine.

Hirao et al (ref #11) was able to report a 98% degree of carboxylation. Hirao first terminated with 4-bromo-1,1,1-trimethoxybutane, followed by treatment with dilute HCl to provide a terminal methyl ester group. This was followed with a final hydrolyses using dilute LiOH to provide the hydroxyl group. While interesting chemistry, neither reaction sequence appears to be commercially interesting.

Epoxy Termination

Epoxy termination was demonstrated (ref #9) when epichlorohydrin was added as a terminating agent. This placed an epoxy group on the end of each polystyrene chain and produced LiCl as a by-product. When these epoxy groups were reacted with a polyfunctional amine (tris-(2-aminoethyl)amine) a star branched polymer was produced. This is an example of unique molecular structure that is possible with anionic polymers.

Copolymerization

NBL can be utilized to copolymerize styrene with any non-polar monomer. Butadiene is perhaps the most common and these copolymers have been commercial for years (ref #6). U.S. Pat. No. 6,162,874 reports some recent work involving anionic polymerisation of styrene in the presence of a living SBS block copolymer. Alphamethylstyrene/ styrene has been produced anionically by Dow (U.S. Pat. No. 4,647,632). Alphamethylstyrene/styrene copolymers produced by free radical polymerization have been commercial in the past but suffer from thermal instability. Above about 61° C. the homopolymer of alphamethylstyrene becomes very unstable. Copolymers of Alphamethylstyrene/styrene have significantly improved head distortion temperatures compared to polystyrene. In spite of this highly desired improvement, most if not all of these free radical copolymers have been withdrawn from the market. The instability has been linked to "triads" of alphamethylstyrene (three alphamethylstyrene molecules in sequence). In U.S. Pat. No. 4,647,632, Dow was able to eliminate formation of these triads and produce thermally stable polymers containing up to 32 wt % alphamethylstyrene. They accomplished this by anionic copolymerisation above 60° C. In a related patent (U.S. Pat. No. 4,748,222) Dow has also shown that the amount of NBL required to produce these alphamethylstyrene copolymers can be reduced to $\frac{1}{16}$ of the theoretical amount. This reduction is accomplished by the addition of potassium tertiary-amyl oxide as what they termed an "initiator activator". This activator not only reduced the NBL cost but also produced a product with improved optical properties (better clarity due to reduced Li residual).

There are other possible comonomers for anionic polymerisation with styrene that might become more important in the future. Paramethylstyrene and metamelthylstyrene (or vinyltoluene which has been sold commercially and is a mixture of the two isomers) are two potentials, all of which significantly increase heat distortion temperature of the resulting copolymer.

Molecular Weight Calculation

As mentioned above, when carried out at low temperatures initiation is very much faster than propagation (ref #6). It may thus be assumed, for this design, that all molecules are initiated at the same time.

When the propagation is carried out under ideal conditions (low temperature initiation and no initiator consuming impurities in the monomer), the molecular weight can be simply calculated and is equal to the total monomer weight divided by the mols of initiator. In this case all molecules are exactly the same size and the number average (Mn) and the weight average (Mw) molecular weight are equal:

$$Mw=Mn=\text{lb monomer/lb-mol initiator}$$

or $$\text{lb-mol initiator}=\text{lb monomer}/Mn$$

For example, the production of 10,000 lb of polystyrene with a 200,000 molecular weight would require 0.050 lb-mol of NBL (providing a concentration in monomer of 0.0004525 g-mol/L). NBL has 64.06 lb/lb-mol therefore 3.2 lb of NBL would be required for this 10,000 lb batch.

Effect of Molecular Weight Distribution

The most common and simplest way to designate the molecular weight distribution is to compare the weight average (Mw) to the number average (Mn) molecular weight. If all molecules are exactly the same size, Mw is equal to Mn and the ratio of Mw/Mn is 1.0 (often referred to as a monodisperse distribution). Currently this 1.0 distribution for polystyrene can be accomplished only through anionic polymerization. Commercial free radical polymers usually have Mw/Mn of 3.0 or greater. Under constant temperature (isothermal) polymerization conditions free radical polymerization produces Mw/Mn of exactly 2.0

Measurement Techniques Have Improved

Prior to about 1980 measurement of molecular weight was confined primarily to "single value" techniques. Osmotic pressure or boiling point measurements were confined to relatively low molecular weight resins. Case Western Reserve University was able (10) to extend the useful range of the BP elevation technique significantly upward by employing a technique which allowed temperature differences as small as 0.0001° C. to be detected, Both osmometry and BP elevation, however, yield only number average molecular weight.

The most common technique for determination of relative molecular weight has involved viscosity. Fundamentally the dilute solution viscosity (intrinsic viscosity) can be related closely to weight average molecular weight. This technique is sensitive but is often employed. Concentrated solution viscosity (10 wt %) or, more commonly, melt flow rate have been widely used for process control due to their relative speed of determination. Light scattering or fractionation gives a crude but useful measure of the entire distribution and both Mw and Mn can be extracted from this distribution curve. Both fractionation and light scattering determinations are relatively slow and have often constituted a research project of their own.

New Era with Size Exclusion Chromatography

Size exclusion chromatography is rapid and capable of measurement of the entire distribution but early work was not very reproducible. Recent major advances in this technique have dramatically improved the precision, accuracy, and speed. With a rapid and reliable measurement technique, researchers are able to relate changes in the molecular weight distribution to changes in polymer properties. These improvements have also allowed it to be moved into production plants and utilized for day to day process control.

Anionic Gives Control of Molecular Weight Distribution

Anionic polymerization allows unprecedented ability to control molecular weight distribution of polystyrene. Batch or continuous plug flow reactors can produce polystyrene with Mw/Mn of almost exactly 1.0. In a back mixed reactor operating in a monomer starved condition (as will be discussed below—U.S. Pat. No. 4,647,632, 4,572,819) polystyrene with Mw/Mn of exactly 2.0 is produced. It is possible to produce polymers with unique characteristics by blending monodisperse high and monodisperse low molecular weight polymers. This blending can produce bimodal or trimodal distributions with "spikes" in the distribution curve compared to the smooth distribution curve obtained with free radical initiators. This blending ability offers a unique opportunity (and challenge) for researchers to develop polymers with a "tailored" molecular weight distribution designed for specific applications. While not included in this design, it is believed that the mixtures of narrow molecular weight distribution polystyrene will produce some surprising property advantages. Such blends are currently being produced in polyethylene polymers and are gaining wide commercial acceptance.

Polymer strength can always be increased by the simple act of increasing molecular weight. This increase in strength, however, is always accompanied by an increase in melt viscosity that reduces processability. There is no theoretical limit on the molecular weight that can be produced by either free radical or anionic polymerization (anionic techniques, however, become more practical as molecular weight increases while free radical becomes less practical). The ability to process the polymers in commercial injection molding equipment, at reasonable rates, falls rapidly when Mw goes much beyond about 200,000. The ability to process in commercial extrusion equipment decreases when Mw exceeds about 300,000. These two values have placed an approximate limit on the strength of commercial polystyrene that can be processed in commercial fabrication equipment. This flexural strength limit for molding grade resin is about 7000 psi and about 10,000 psi for extrusion grade.

Unique Property Balances Possible with Anionic Initiation

Dow and Clemson (ref #7) have cooperated to demonstrate that some distributions produce a uniquely good combination of high strength with good processability. They found that when the melt flow rate was maintained at 6.0 g/10 min and molecular weight distribution was decreased from the usual commercial distribution of about Mw/Mn=3 (flexural strength=7500 psi), to Mw/Mn=2 (flexural strength=8700 psi), and finally to Mw/Mn=1 (flexural strength=11,200 psi), a major increase in strength was obtained. Melt flow rate is the most common commercial measure of processability. The higher the melt flow rate the better the processability. Thus the extremely narrow molecular weight distribution (essentially all molecules the same size or Mw/Mn=1.0) that can be obtained with anionic polymerization yields the best performing polystyrene. Dow (U.S. Pat. No. 4,883,846) supported this relationship with additional strength versus processability data for a series of narrow molecular weight distribution polystyrenes.

Overall Polymerization Rate

From the rate constant (kp=2L/mol-sec) given above for benzene, it is possible to calculate the approximate overall polymerization rate (Rp) for styrene and the associated heat evolution rate. The kinetics are reported to be simple second order (ref #6)

$$R_p = k_p[M-][M]$$

For the case of pure undiluted styrene, [M] is 8.689 mol/L and for Mw=200,000, [M]=0.0004525 (see above). Then assuming that styrene acting as it's own solvent will have the same kp at 25° C. as benzene ($k_p$=2L/mol-sec), $R_p$=0.0786 mol (of styrene)/L-sec.

Upper Rate Limit

If I make the simplifying assumptions that this rate continues until all styrene is consumed the total reaction time can be calculated as (8.689 mol/L)/(0.0786 mol/L-sec). The styrene would hypothetically be consumed in only 110.5 sec at 25° C. In practice this just gives an indication of the upper limit of the reaction speed. Several factors that are difficult to quantify influence the reaction speed:

Increased concentration of monomer decreases the kinetic constant (ref #1).

Increased temperature increases the rate,

Decreasing monomer concentration decreases overall rate,

Increased viscosity decreases rate

In this design the rate of propagation will be increased greatly as the temperature rises but slowed slightly by the increasing viscosity. The propagation rate has been shown to more than double with each 10° C. increase in temperature with activation energy of about 14 kcal/mol (ref #1). Worsfold et al reported similar activation energy of 14.3 kcal/mol (ref #2). The above 110.5 sec reaction time only gives a rough indication of the tremendous speed of anionic polymerization with styrene. I have considered the propagation rate to be so rapid that it is a relatively insignificant part of the total batch polymerisation cycle compared to the time required to heat, cool, load, and unload.

Heat Evolution Rate

The heat of polymerization of styrene is 288 btu/lb (ref #6). If all of this heat is released in 110.5 sec (calculated above), the instantaneous rate of heat generation will be extremely high (9400 btu/hour). The adiabatic temperature rise during this short time can be approximated as 360° C. by taking the specific heat as 0.80 btu/lb-° C. (ref #6).

These approximate numbers are useful to visualize the heat removal "problems" encountered when attempting to fit anionic polymerization of styrene into conventional (free radical) polymerization facilities. The various approaches that have been taken to address this heat removal challenge are discussed in the next section.

Review of Anionic Polymerization Processes for Polystyrene

Most early efforts to utilize anionic polymerization involved attempts to control the very rapid polymerization rates in conventional types of polystyrene reactor configuration. Use of conventional techniques, however, tends to treat the rapid polymerization rate as a threat rather than taking advantage of this feature. More recent literature, and this design, have diverged from conventional processes and are attempting to capitalize on the advantages of the rapid anionic polymerization rate. These efforts along with other aspects of anionic polymerisation are discussed in this section.

Feed Clean-Up Requirements

Vacuum Flash Followed by Alumina Beds is Effective

Dow (U.S. Pat. No. 4,572,819, 4,725,654) disclosed a technique for cleaning prior to introduction of the initiator. The styrene/ethylbenzene feed stream was cleaned by heating to 55° C. then spraying into a vacuum chamber at 20 mm Hg. Next the feed stream was passed through a L/D=18 bed of molecular sieves (Linde 3A). This treatment prepared the feed for NBL addition but left about 40 ppm of phenylacetylene. Low levels of phenylacetylene do not consume significant amounts of NBL, but do result in a very slight color formation in the polystyrene product. Later Dow added additional examples of these two feed cleaning operations (U.S. Pat. No. 4,883,846)

Hydrogenation Eliminates Phenylacetylene

While not significant for most commercial uses, the slight color resulting from phenyl acetylene is significant for certain demanding optical uses (such as fiber optics). For this and other color critical applications, Dow (U.S. Pat. No. 4,883,846) has developed a simple hydrogenation process that reduces the phenylacetylene to either styrene or ethylbenzene immediately prior to polymerisation. Dow describes this hydrogenation process and the catalyst used in somewhat more detail in U.S. Pat. No. 5,064,918, 4,822,936, and U.S. Pat. No. 4,389,517. An example involved dissolving 1000 ppm of hydrogen in the styrene that was then passed over a fixed bed of palladium on alumina at room temperature.

Monomer Starved Polymerization

One way that has been shown to control the heat of polymerization is to operate in a monomer starved condition. This concept was explored by Dow using recirculated loop reactors with high solvent concentrations. Copolymers were explored in U.S. Pat. No. 4,647,632 and polystyrene in U.S. Pat. No. 4,572,819. In a typical reaction ethyl benzene solvent level in the feed was 40% and the very low monomer content in the reactor (consistently less than 1 wt %) would vary with the reaction temperature. Higher temperatures with resulting faster rates would have the lowest monomer content while lower reactor temperatures would have slower rates and correspondingly higher monomer contents. While not reported quantitatively in these references, it is believed that monomer content would be fractions of one wt % in the temperature ranges examined. This Dow work resulted in polystyrene with a weight average (Mw) to number average (Mn) ratio of 2 which is the same as would normally be obtained by isothermal free radical polymerization. This work produced a useful polymer and controlled the heat release from the anionic polymerization process but does not take full advantage of the rapid anionic polymerization rate nor address the question of gel formation.

Precipitation/Suspension Polymerization

In 1994 BASF (DE 4443752, WO 96/1864) patented a suspension/precipitation type process for producing anionic polystyrene. Aliphatic hydrocarbons (such as hexane) are solvents for the monomer but non-solvents for the polymer. As polymer is produced it is precipitated and does not significantly increase the bulk viscosity and thus does not greatly decrease the heat transfer coefficient. The resulting good heat transfer combined with sensible heat absorption of the solvent allowed the rapid release of heat of polymerization to be tolerated. A butadiene/styrene block copolymer was needed to stabilize the suspension of polystyrene. The product had a high molecular weight and a narrow molecular weight distribution (Mw/Mn approaching 1). This BASF suspension process controlled the rapid polymerization rate of anionic but did not take full advantage of it. This approach also does not address the gel formation question. While most of the precipitated polymer will be in suspension, some will adhere to the wall and continue to grow in subsequent batches to ultimately present a problem. Mobile (U.S. Pat. No. 4,942,209) had also used this suspension technique to produce very small (3.5 micron) and very uniform particles (Dw/Dn=1.19) of anionic polystyrene.

Kim et al (ref #19) examined the relative location of the growing ends on these dispersed particles. Kim used poly(t-butylstyrene) to stabilize the dispersion in hexane. Varying the molecular weight of the stabilizing poly(t-butylstyrene) could vary particle size from 0.6 to 8.0 micron. Divinylbenzene was used to tightly cross-link the particles and render them relatively resistant to permeation by terminating agents that would provide carboxyl or hydroxyl terminal groups on those chains having the active end on the surface. Analysis for the functional groups on the surface indicated that 70 to 90% of the growing active chain ends are on the surface.

Adiabatic Polymerization

A number of approaches by a number of researchers have ignored heat removal and allowed adiabatic polymerisation. These various approaches are discussed in the following paragraphs.

Single Pass Tubular

In 1997 BASF patented (U.S. Pat. No. 5,717,040, FIG. 2) an adiabatic process for continuous anionic polymerization of polystyrene. The process was carried out with ethylbenzene as a solvent in a "single pass"-tubular reactor. At 32.5 wt % styrene, conversion was 100% with a temperature rise from 40° C. to 171° C. This is a technique that takes partial advantage of the rapid anionic polymerization rate in that the reactor residence time is very small (100.5 sec in this case). This process still requires an expensive devolatilization step from relatively low solids. Most commercial processes for polystyrene require solid levels of greater than 80 wt % for practical devolatilization.

In a later patent (WO 98/07765) BASF demonstrated higher solids (90 to 100%) when a retarder such as dibutylmagnesium was used in conjunction with sec-butyllithium. This work was not entirely adiabatic since the retarder slowed the reaction enough to allow heat removal to keep the outlet temperature in the 205 to 240° C. range. In WO 97/9701585, BASF used a very small (2 mm diameter) tube reactor initiated with only sec-butyllithium. The bath temperature was controlled at 100°C. to produce a polymer with less than 5 ppm residual styrene in 1.4 minutes residence time. The polymer had a Mw of 115,000 and an Mn of 96,000. The gel formation question is not addressed in any of these BASF patents but is now known to be a severe problem for this type of reactor.

Recirculated Reactor, Adiabatic Finishing

In a 1999 BASF patent (U.S. Pat No. 5,902,865, FIG. 3) a recirculated reactor (CSTR) followed by an adiabatic finishing step was described. This patent used cyclohexane as a solvent (at about 50 wt %) and converted 64% of the monomer in the first reactor at 35C. The temperature was maintained at 35° C. by carrying out the reaction in an extremely high surface to volume (50 m2/m3) static mixer. An adiabatic temperature rise to 103° C. occurred in the second reactor as conversion was completed. The product had an Mw of 230,000 and Mw/Mn of 1.2. The gel formation problem was also not addressed in this BASF work. Very short experimental runs would not exhibit gel, which accumulates over longer runs where it either plugs the reactor or produces large quantities of harmful gels, or both.

Adiabatic Polymerization Reactors in Series

In 1993 BASF (U.S. Pat No. 5,391,655, FIG. 4) patented a process that used a sequence of four adiabatic anionic reactors in sequence. Styrene monomer was injected prior to each reactor and would have completely reacted within that reactor. There was a heat exchanger after each to remove the heat of polymerization generated in that reactor. They used this sequence of reactors to produce a 48 wt % solution of polystyrene in cyclohexane. Before each reactor there was a styrene addition but secondary butyllithium was generally added to only the first reactor. After each reactor and prior to introduction of the next monomer the stream was cooled.

A temperature rise of about 5° C. was allowed in each reactor. The overall space-time yield of the reactor was 1000 kg of polymer per cubic meter of reactor volume. The average degree of polymerization in the first example was 2050 (molecular weight of 213,000) with Mw/Mn=1.1. In one example, butyllithium was also added to the second reactor to yield a product that Assume would have a bimodal distribution with high Mw product produced in the first reactor (which would continue to grow as it progresses through the reactors) and a lower Mw product due to this second addition of initiator It seems likely that cooling between reactors would be the rate limiting factor in the examples. Without this heat exchange limitation the throughput could be increased until conversion began to drop (it seems likely that orders of magnitude increases in rate would be found). BASF did not address gel formation in this reactor sequence. Gel formation rate in this and the above BASF reactor designs would be slowed by the high solvent level and may not have appeared during short demonstration runs.

Boiling Reactor Polymerization

In 1978 Bayer (U.S. Pat. No. 4,200,713, FIG. 5) disclosed a boiling process for the anionic production of polystyrene. A tubular reactor (called an evaporator) was used which combined the need for heat removal with the need to remove volatile from the polymer. Monomer was allowed to flash as polymerization progressed in downward flow through a heated tubular reactor. Temperature was increased progressively through three zones, the last at 220° C. (average residence time of three minutes). The product was introduced into a devolatilizing extruder with a vent port operated at 5 millibar.

The Bayer process was able to utilize the rapid polymerization rate of anionic polymerization effectively. It seems likely to have not been put into commercial operation due to the tendency to form gels and foul the heat transfer surface on lengthy runs.

In 1983 Dow gave an example of continuous polymerisation in a boiling CSTR (U.S. Pat. No. 4,725,654, FIG. 6).

An agitated boiling 500 gal reactor was mounted on load cells so that the contents could be maintained at a constant weight of 1500 lb. The 42 wt % styrene in ethylbenzene feed stream was passed through a 40:1 L:D molecular sieve bed with a velocity of 2.5 parts of stream per part of bed then introduced to the reactor at a rate of 850 lb/hr (residence time of 106 minutes). Boiling was used to remove the heat of reaction and maintain the temperature of the reacting mixture at 100 C. This was accomplished at a reactor pressure of 237 mm Hg. Vapors were condensed in a vertical exchanger and returned to the vessel. Normal butyllithium (NBL) was fed at 80 ppm based on total feed. The product was removed with a variable speed gear pump that was controlled to maintain the vessel weight constant at 1500 lb. While no gels were reported in the main example, after only 24 hours of operation using only the boiling action to agitate large lumps or gels were seen in the extruded product. The high solvent level, the turbulence induced by the boiling, and the agitation combine to delay (but not eliminate) the inevitable wall fouling with its subsequent gel formation.

Polymerization in Counter Current Spray Tower

Shell (U.S. Pat. No. 5,587,428, FIG. 6) describes a process that appears to eliminate the gel problem and takes advantage of the rapid rates of polymerization attained with anionic polymerization of styrene. Shell utilizes a counter current cooled spray tower reactor to carry out this polymerization. The cool initiated monomer (secondary butyllithium) was dispersed into uniform 0.5 to 3 mm droplets (using a "rotation bucket" type nozzle). These droplets were passed downward into a stream of compressed (290 psi) nitrogen that was introduced at about 40° C. but had been warmed by the heat of polymerisation from the beads near the bottom of the column. This inert gas also accumulates styrene vapor from the lower beads. The heat transfer from the warm nitrogen and condensing monomer quickly warm the droplets and initiate polymerization. Polymerization is essentially complete by the time (about 10 seconds) the droplets (now beads below the 100° C. glass transition temperature) reach the bottom of the column. A product containing about 500 ppm of residual styrene with Mw=100,000 was produced. Termination was not discussed but it may be assumed that it would occur over a period of a few hours as oxygen, water, and carbon dioxide diffuse into the particles. This process was judged particularly useful for the production of expandable polystyrene when nitrogen is replaced with a hydrocarbon blowing agent.

This process would eliminate gel formation on the walls but not on the spray nozzles that come into contact with the hot exiting gases. In order to produce the uniform particles required for this process to operate it is important that all nozzles are free of gel. It seems likely that partial plugging of the nozzles as well as gel expelled from the nozzles would present potential problems. It is not clear why the product contains as much as 500 ppm of residual styrene monomer. While this level is within the specification limits of much of the current commercial polystyrene, much lower levels would probably be obtained by simply allowing the solid polymer to age in the absence of terminating agents.

Polymerization in A Static Mixer

Sultzer proposed (U.S. Pat. No. 5,602,216, FIG. 8) to reduce the viscosity gradients (which lead to the production of gel although they did not address the gel issue). They reduced these gradients by carrying out the polymerisation within a recirculated tubular reactor system. This system consisted of three segments. Each segment contained multiple static mixing elements. These elements were designed to continually remove material from near the mixing element walls and place it into the center of the flowing stream. Sultzer's design involved a polymerisation segment that increased solids to 50% followed by a thermal termination segment then a cooling segment. Fresh styrene was injected just before the cooler segment. After this cooler and before the polymerisation segment, initiator was added.

This approach would produce a more uniform flow pattern in the major portion of the stream. It would not, however, solve the problem of accumulation on the walls. It is believed that the large static surface area presented by the mixing elements would produce gels relatively quickly. The Sultzer reaction scheme presents the same high surface area per volume as the Dow reactor described in comparative example #3 of U.S. Pat. No. 4,725,654 that produced large visible gels after a very short period of operation.

Gel Formation on Walls During Polymerization

A major problem that will occur with anionic technologies is associated with the living polymer aspect. There is a slow moving laminar layer along the wall of the reactor (even in turbulent flow there is the laminar sub-layer). The living ends in this slow moving layer just keep growing and growing as new monomer diffuses to them. The growing molecules create a static layer of swollen polymer on the static surface, which continues to expand. This expansion reduces the size of the vessel and ultimately produces "gels" in the product as sections of the now ultra high molecular weight polymer break off. Heat transfer coefficients would also drop dramatically as the high molecular layer accumulates on the wall. This problem was discussed earlier in the "Living Polymer Drawbacks" section.

SUMMARY OF THE INVENTION

The extremely rapid anionic polymerization rate of polystyrene has made polymerization difficult to control and has prevented large-scale development. This invention uses batch polymerization to utilize the rapid rate of polymerization to complete polymerization from zero to 100% conversion in minutes and turns the previous fast rate disadvantage into a very great advantage. Polystyrene itself is used as a heat sink to limit and control the maximum temperature reached during polymerization. Adiabatic polymerization increases the polymer temperature to the desired processing temperature of the polymer for either removal of volatile compounds or for direct pellet formation when no solvent is employed. The polystyrene to be used as a heat sink is added either as pellets or is first formed at a low controllable temperature. Boiling is a preferred method of heat removal during this "controlled" stage. As a result of the very rapid rate, extremely low levels of residual monomer is found (surprisingly propagation rates that are much faster than thermal termination rates appear to make this possible)

A major problem associated with commercial use of anionic polymerisation for polystyrene is prevention of the formation of the near infinite molecular weight material that appear in the product as gels. This material forms, as discussed earlier, on stationary surfaces that contain living polymer anions that, in continuous processes, are supplied with an endless amount of reactive monomer. In a short time this extremely high molecular weight material appears as gels in the product and renders the product unusable for molding or extrusion applications. At best the reactor must be shut down and, with great difficulty, cleaned. I have developed a process that can take advantage of the very rapid anionic polymerisation rates while also avoiding the serious gel problem.

DETAILED DESCRIPTION OF INVENTION

The extremely rapid anionic polymerization rate of polystyrene has made polymerization difficult to control and has prevented large-scale development. This invention uses batch polymerization to utilize the rapid rate of polymerization to complete polymerization from zero to 100% conversion in minutes and turns the previous fast rate disadvantage into a very great advantage. Polystyrene itself is used as a heat sink to limit and control the maximum temperature reached during polymerization. Adiabatic polymerization increases the polymer temperature to the desired processing temperature of the polymer for either removal of volatile compounds or for direct pellet formation when no solvent is employed. The polystyrene to be used as a heat sink is added either as pellets or is first formed at a low controllable temperature. Boiling is a preferred method of heat removal during this "controlled" stage. As a result of the very rapid rate, extremely low levels of residual monomer is found (surprisingly propagation rates that are much faster than thermal termination rates appear to make this possible)

Large-scale development has also been hindered by the unrelenting tendency of these anionic "living polymers" to form super sized molecules that appear as unacceptable gels in the product. This invention demonstrates two techniques to prevent gel formation or to reduce formation to an acceptable level. The first involves termination of all living anions prior to starting the next batch, preferably using thermal termination. The second technique involves adding the next monomer batch and using violent agitation at low temperature to form a solution of the living ends in the new monomer the living ends grow to a somewhat larger size but do not remain to form the near infinite size molecules associated with gels.

There are several embodiments to this invention, details on some of the most important follow:

Batch Boiling/Adiabatic Finish/Solvent Wash

One technique of this invention that eliminates the "gel" problem is an improvement on the batch, boiling polymerisation technique proposed by Dow in U.S. Pat. Nos. 4,883,846 and 4,725,654. This improvement could either use pure styrene monomer or monomer solvent mixtures. By adding fresh reactants at the low temperature (less than about 25° C.) un-terminated polymer from the previous batch could be dissolved prior to any significant propagation occurring. Once living polymer from the previous batch is completely dissolved from the reactor walls the problem of polymer accumulation to form ultra high molecular weight gels is eliminated. The un-terminated molecules in solution do not present the problem of growing to "infinite" length (even though they will grow to approximately two times the average molecular weight as they compete with fresh anions in the next batch polymerization). This added growth is not a problem since for practical purposes they will all be discharged with the next batch. Only a very slight broadening of the molecular weight will occur with a detectable but small peak at around two times the average molecular weight.

Another technique of this invention involves batch reactions using ethylbenzene levels of 20 to 40 wt % would begin by addition of solvent to the reactor first. The solvent would be recirculated through a conventional reactor cleaning system, such as the Gamma Jet or by use of agitation system designed to "splash" when operated at partial level or at high speed or both. When all of the living polymer is in solution, the styrene is added followed by the initiator (at a temperature below 25° C. as described in U.S. Pat. No. 4,883,846). This procedure would require the use of devolatization equipment to remove the ethylbenzene for recycling.

If added solvent is not used, the procedure will be similar to the above using ethylbenzene as a solvent. Styrene monomer itself will serve to dissolve the living polymeric anions prior to addition of the new initiator. In this case it will be important to proceed reasonable rapidly to the polymerization stage since the living anions will begin to grow as soon as exposed to fresh monomer. This growth will be relatively slow at low temperatures, but will ultimately polymerise the entire vessel contents to a very high molecular weight if left for sufficient time (a day or two). This prospect is avoided by not adding the styrene until ready to proceed with a polymerisation. With pure styrene, more heat will need to be removed resulting in more vigorous boiling. More of the reactor space (say 0.5 to 0.9 of the total volume) will need to be reserved for foam disengagement. Adjusting the pressure in the reactor will control the temperature for this part of the polymerisation. When the reaction reaches about 50% conversion to polystyrene the condenser valve may be closed allowing the pressure to initially rise then fall as the reaction to proceeds adiabatically to completion. The final temperature will be controlled by the amount of polymer produced prior to the adiabatic stage and the initial temperature. The final temperature after the adiabatic rise will preferably be between about 180° C. and 290° C. If the temperature is much below 180° C. the polymer will not be pumpable unless at very low molecular weight, which will have limited but important applications. Above about 290° C. the polymer will begin to decompose at a significant rate allowing for only very short times at that temperature. Most preferable the final temperature will be between about 220° C. and 260° C. for molding grade material.

Batch Boiling/Adiabatic Finish/Thermal Termination

Another technique of this invention, when using pure styrene monomer, as in the previous paragraph, is to dump the reactor after polymerisation is complete then either hold (for longer times) or continue to increase the reactor temperature (to about 240–300° C. for shorter times) to cause thermal termination of the living anions on the walls. Thermal termination will eliminate the living anions and the associated gel problems. As an alternate to thermal termination, a chemical terminating agent may be introduced into the reactor. More control is required with chemical termination to avoid an effect on molecular weight of subsequent batches, and thermal termination is preferred. Since the living anions are strongly colored, and disappearance of this color is an excellent indication of termination completion.

Adiabatic/Recycled Polymer as a Heat Sink/Thermal Termination

If a mix of 50% monomer and 50% polymer granules is allowed to react adiabatically starting from 70° C., the final temperature will be 240° C. This is near the optimum temperature for the handling of polystyrene melt. The sensible heat required to raise the total mass to 240° C. exactly consumes the heat of polymerisation. In practice, there will always be some heat loss and the final temperature will be adjusted by increasing the monomer to granule ratio or by increasing the starting temperature. More monomer will, of course, increase the final temperature while less monomer will decrease it. The entire polymerisation takes place in a few minutes. This approach is one of my examples for this Now Provisional patent application.

Anionic Process Description

Of all of the possible approaches to production of anionic polystyrene, there are only three that overcomes the fatal problem of gel accumulation and take advantage of the rapid rates:

1) Adiabatic polymerization in batches with recycled polymer as a heat sink followed by thermal termination of the living polymer ends.
2) Batch polymerization using boiling to remove heat and pressure to control the temperature until about 50% conversion. The converted polymer then acts as a heat sink with adiabatic polymerization to completion followed by thermal termination.
3) Batch polymerization using boiling to remove heat and pressure to control the temperature until about 50% conversion. The converted polymer then acts as a heat sink with adiabatic polymerization to completion followed by solvent wash wherein the preferable solvent is styrene monomer.

THE FOLLOWING EXAMPLES FURTHER ILLUSTRATE THE PRESENT INVENTION

Example 1

Figure 10:
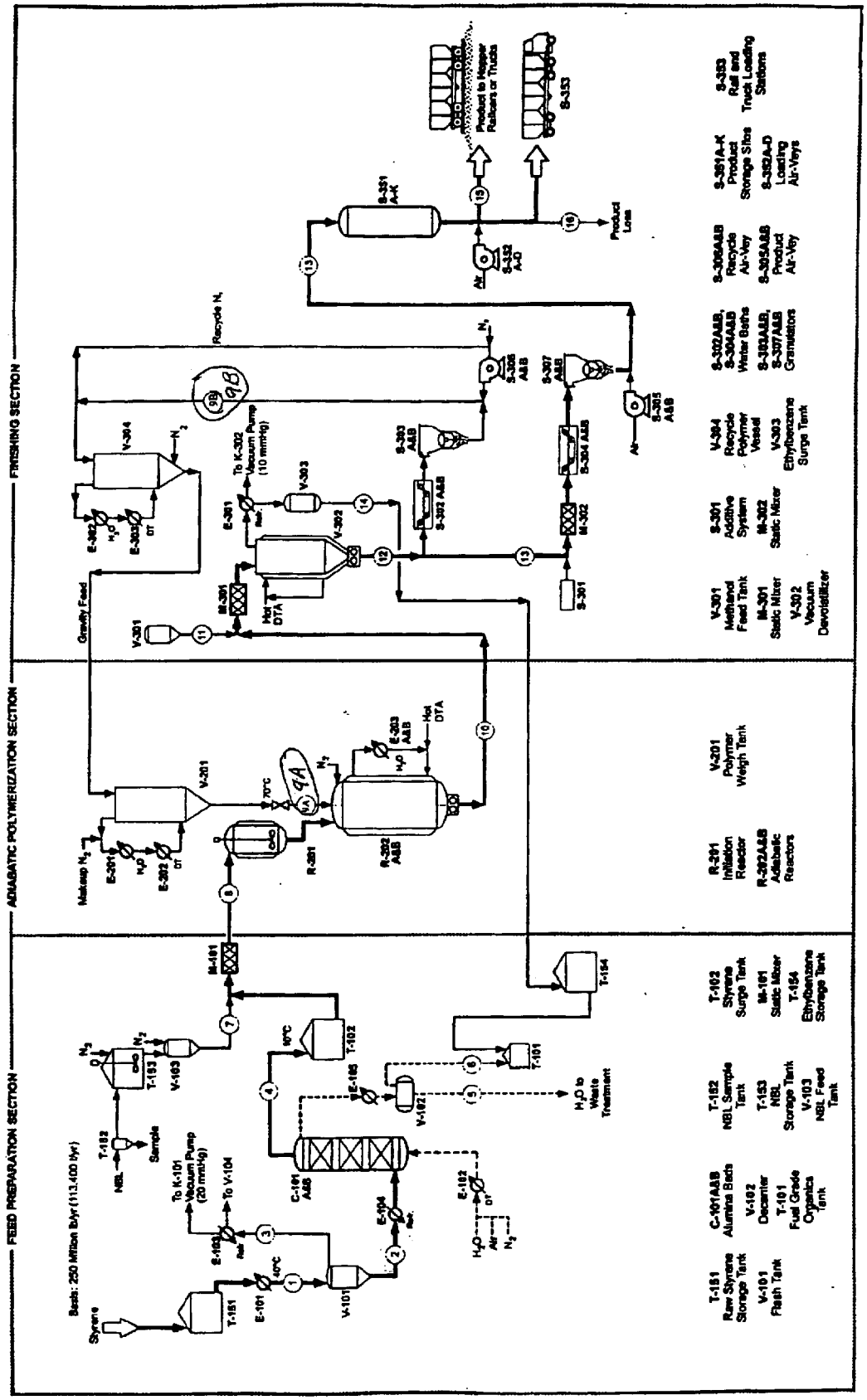
Figure 11:
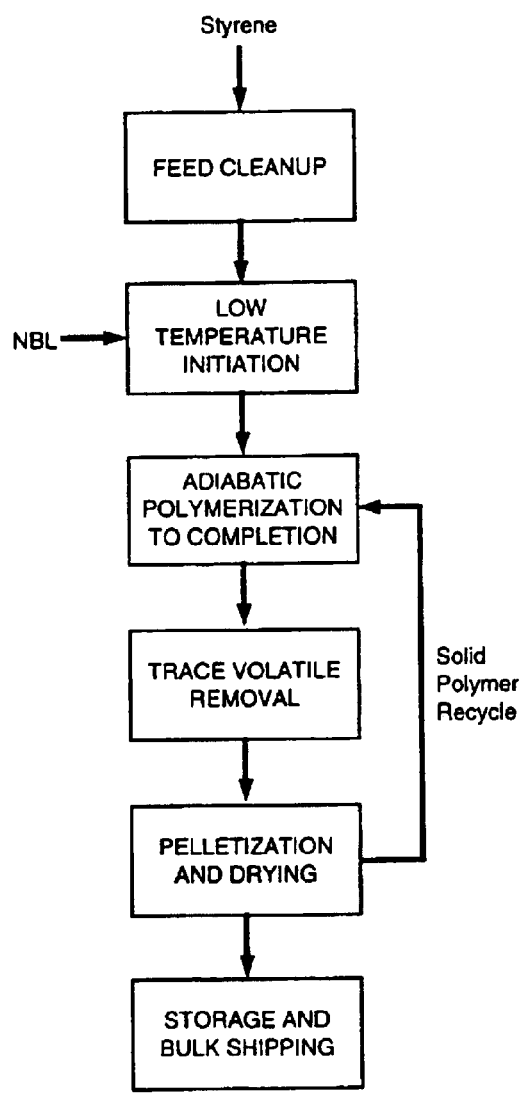

This example is based on the use of recycled polymer which acts as a heat sink to control the adiabatic temperature rise to the desired final temperature. The output of this plant is 30,041 lb of polystyrene per hour. All of the hourly stream flows are shown in table 2. The process flow diagram is shown in FIG. 10 and the process is shown as a block flow sheet in FIG. 11. Major equipment is shown in table 3 The process consists of three sections:

Section 100—Feed Preparation involving removal of all polar impurities

Section 200—Adiabatic Polymerization to the desired finishing temperature

Section 300—Finishing to produce polymer for both sale and for recycle

The basis for this example is shown in Table 1, which also shows the average characteristics of the product.

Section 100—Feed Preparation

Styrene monomer is delivered by rail and stored in T-151. When received, it is inhibited with tertiarybutylcatechol (TBC) and is stored off-site at ambient temperature. Inhibitor level is monitored periodically and (in rare cases) may need to be added shot wise.

The monomer (stream 1) is passed through E-101 where it is heated to 50° C. and sprayed into Flash Tank, V-101, that is under reduced pressure of about 20 mm Hg. Traces of water, oxygen, and other volatile impurities are vaporized (stream 3) and condensed in E-103. Condensate is drained to decanter V-102 where water (stream 5) is removed and the organic layer (stream 6) stored in T-101 to be used for fuel. TBC inhibitor is added to V-102 to prevent the possibility of polymerisation of this organic layer.

The styrene monomer (stream 2) is then cooled to 10° C. in E-104 then passed upward through a bed of activated alumina in C-101. The activated alumina removes the TBC inhibitor and traces of polar compounds. The clean stream is stored in Surge Tank T-102. Up to this point the process is continuous.

The next step (polymerisation) is, however, carried out in a batch manner. T-102 is continuously receiving cooled monomer (stream 4) but the monomer is removed batch-wise for the batch adiabatic polymerisation to follow. Batch polymerisation is necessary to obtain the desired narrow molecular weight distribution. As these monomer batches are being forwarded to R-201 (stream 8), NBL initiator (stream 7) is added (as a 15% solution in ethylbenzene) and is mixed in static mixer M-101.

Section 200—Adiabatic Polymerization

Low temperature initiation takes place in the well-agitated R-101 over a period of 15 minutes. The adiabatic polymerisation is carried out alternately in R-202A and R-202B. Solid polymer pellets at about 70° C. are loaded by gravity (stream 9A) into R-202A,B from Weight Tank V-201. After the warm solid polymer addition is complete, the monomer stream from R-201, containing the NBL initiator, is added rapidly. The elevated temperature of the pellets is sufficient to increase the polymerization rate. The rapid release of the heat of polymerization causes the temperature to rise and the reaction to accelerate as it rises. The reaction is complete in less than 10 minutes. Longer reaction time is allowed primarily to assure temperature uniformity of the polymer melt, as the newly formed polymer heats the cool granules. The cool polymer pellets serve as a "heat sink" and limit the maximum temperature rise as polymerisation proceeds adiabatically to completion with a target of 10 ppm of residue monomer (or 99.99999% conversion).

After the polymerization cycle is complete, the molten polymer (stream 10) is removed by a gear pump and transferred to the finishing section. The R-202 reactor is then heated briefly to about 260–300° C. to thermally terminate any living ends. This heating is a precaution to prevent gel build-up on the reactor walls and may not be required after every batch. Termination is determined with an instrument designed to measure the disappearance of the bright color associated with the living styryl anion.

Section 300—Finishing

After polymerization in R202A,B, the next step is termination, which is carried out on stream 10 by precise addition of a stoichiometric amount of methanol from (stream 11) V-301. The methanol is mixed (in Static Mixer M-301) into the living polymer stream where it reacts with the living styryl ends.

Adiabatic polymerization has increased the polymer temperature to the 230–260° C. range required for both polymer flow and volatile removal. The small amount of residual ethylbenzene (about 0.2 wt %) is removed in the Vacuum Devolatilizer (V-302). This very pure ethylbenzene is condensed in E-301, collected in V-303, and (stream 14) stored in T-152. When a railcar full has accumulated in, it is returned to a styrene plant for cracking to styrene.

Upon entering high vacuum of V-302 the ethyl benzene vaporizes, causing foaming in the polystyrene. The ethylbenzene vapor quickly disengages from the polymer and the polymer is removed from the bottom of V-302 with gear pumps (M-302A–D). The polymer stream exiting V-302 (stream 12) is split into approximately two equal streams, a product stream (13) and a recycle stream (9B).

The product stream has the desired additives (lubricants, flow aids, dyes, etc) introduced immediately before static mixer M-303. The polymer is then pumped through S-304A,B that includes a stranding die and a water-cooling bath. From the cooling bath the multiple strands pass under an air knife (to remove surface water) and enter a pelletizing cutter (S-307A,B). The product is then pneumatically conveyed (stream 13) to Storage Silos V-305A–F to await bulk shipment (stream 15) by rail or truck "Miscellaneous product losses are shown as stream 16."

The polymer recycle stream is passed through a similar stranding die and cooler (S-302A,B) and pelletizing cutter (S-303A,B). From this point on the recycled pellets are maintained under a blanket of nitrogen. The polystyrene pellets continue to be cooled by a cool stream of nitrogen as they are further dried and pneumatically conveyed (stream 9B) to Surge Silo V-304. In V-304 the polymer temperature is adjusted to the desired value (70° C. in this case). The polymer is transferred by gravity flow to V-201 in a batch wise manner. From V-201 it is transferred (stream 9A) into reactor R-201 where it serves as a heat sink to limit the maximum adiabatic temperature rise during polymerization Average stream flow rates and compositions are shown in table 2 while additional pertinent data and batch timing sequences are shown in the DESIGN BASIS (Table 1).

Additional Details for Example 1

Section 100—Feed Preparation

Flash Removal of Volatile Impurities

Styrene is heated slightly to 50° C. in E-101. This heating allows volatile impurities such as water, carbon dioxide, and oxygen to be removed in Flash Tank V-101 in which a vacuum is maintained. A tempered water system is used to avoid polymerisation that might occur in hot spots in E-101

Activated Alumina Beds

After the vacuum flash, the styrene is cooled to 10° C. and then remaining polar impurities are removed in Alumina Beds (C-101A,B). The two beds are operated in series unless one of the beds is being regenerated in which case only one bed is used. When the beds are static for more than a few hours they must be flushed with ethylbenzene to prevent polymerisation and the resulting fouling of the alumina beds.

These beds have a relatively long life with continuous operation and only require regeneration about every three months of operation. The second bed is treated as a "guard" bed for the first with daily sample analysis (by gas chromatography) immediately before it. When there is a "break through" of impurities, the first bed is removed from service and regenerated. Regeneration takes place in several steps:

The column is drained then rinsed with recirculated ethylbenzene,

Ethyl benzene is drained to T-101 the Fuel Grade Organic Tank (TBC inhibitor may be added to T-101 if polymerization of the styrene becomes a concern), The column is steam stripped with steam generated in E-102 (heated with circulating Dow-therm™ Liquid). Steam with vaporized ethylbenzene is condensed in E-105 and the organic separated in V-102 (decanter), The bed is heated to >250° C. and hot air is passed until there is no $CO_2$ detected in the outlet, indicating that all of the organic has been oxidized, The bed is then purged with nitrogen as it is cooled, When purged and cooled it is ready to return to service and is be flushed with ethylbenzene to release heat of absorption then placed after the now first alumina bed.

NBL Handling

NBL is received in rail tank cars. While not extremely sensitive to temperature it does slowly decompose to form solid LiH (and butene). This reaction is accelerated at elevated temperatures making it desirable to have NBL tanks and lines insulated and shaded from sunlight. Since NBL reacts rapidly with moisture, all transfers require a nitrogen blanket to replace the displaced liquid. Carbon dioxide is not acceptable as an inert gas in this case since it also reacts with NBL.

NBL Storage and Supply Line Cleaning

NBL is thermally terminated very slowly during ambient storage but this is still a concern. This termination produces a deposit of solid LiH (mp=680° C.). On a periodic basis (yearly in this design) it is necessary to clean the NBL storage tank and lines used to transport the NBL (reference #20). This cleaning consists of:

Recirculate ethylbenzene through entire system, then drain and return contaminated ethylbenzene to NBL supplier, Purge system with nitrogen and gradually introduce steam into the nitrogen stream until 50/50 by volume. Continue this flow until exhaust gas is free of Hydrogen or butane, Fill vessels and lines with water and recirculate for several hours then discharge the now alkaline water to the waste water treatment facility, Dry the entire system with a flow of air, Purge system with nitrogen Reintroduce NBL solution Start Up of Section 100

When dry activated alumina is first exposed to an organic liquid a significant heat of absorption is evolved. If styrene monomer is the first organic there is the likelihood of polymer formation. This polymer would only be a minor contaminant to the polystyrene product but might foul the alumina. The alumina beds (C-101A,B) are therefore first flushed with ethylbenzene, which releases this heat of absorption without polymerisation potential. This ethylbenzene is returned to T-152.

After draining the ethylbenzene from the beds, the flash tank (V-101) is evacuated and styrene flow from T-151 started at the desired rate. The styrene is heated slightly to promote removal of water and dissolved oxygen and is cooled immediately before entering the alumina beds. In addition to miscellaneous polar impurities, the alumina beds remove all of the TBC inhibitor. The uninhibited styrene must now be handled with greater care since it will polymerise readily if heated, releasing the 288 btu/lb heat of polymerisation.

Once the flow through the bed is started it will flow continuously to prevent polymerisation in the columns and lines. Monomer purity may be confirmed with high performance gas phase chromatography to record individual impurities. Alternately titration with dilute NBL can be used to determine harmful impurity levels. When the NBL has consumed all of the impurities the color of the bright orange styryl anion will appear. While simple in concept, use of NBL to clean up (remove reactive impurities) the monomer it is too expensive and also reduces the polystyrene product clarity.

When enough pure styrene has accumulated in Surge Tank T-102, batch loading of the Initiation Reactor R-201 can begin. As the styrene is transferred, NBL is metered into the stream just before the mixer (M-101). M-101 is a static mixer (such as available from the Chemineer Division of Robbins & Myers Inc.). that is located immediately before R-201 Initiator flow is stopped before the monomer flow is stopped. This sequence flushes any initiated styrene from the mixer and final section of line, reducing the possibility of anionic polymer forming in the mixer or line.

Section 200—Adiabatic Polymerization

Initiation

Initiation is carried out at low temperature in R-201. At temperatures of the order of 10° C. or lower initiation is relatively rapid compared to propagation. This speed difference allows each molecule of NBL to initiate one stryl anion before significant propagation takes place. When propagation begins all molecules then grow at the same rate and reach very nearly the same length, giving a desirable narrow molecular weight distribution (Mw/Mn=1.1). In the case that propagation should begin in R-201 the maximum temperature rise would be about 360° C. The most severe pressure rise associated with this would be the vapor pressure of pure styrene (546 psig). R-201 is designed for 600 psig to contain this worst case. This design is very conservative since the vapor pressure of styrene monomer is much lower as conversion to polystyrene approaches completion. In addition a rupture disc protects the vessel. To reduce the possibility of significant propagation in R-201, it is desirable to not load R-201 until the polymerisation reactor (R-202) is fully loaded with solid polymer, and ready for polymerisation.

Polymerization

Polymerization takes place rapidly in R-202A,B. The two reactors are operated in sequence so that one is always being emptied to supply the continuous vacuum devolatilizer (V-302)

V-201 (mounted on load cells) is loaded with the exact charge of "anionically clean" polymer granules. The temperature of this polymer in V-201 is adjusted by recirculating nitrogen that is either cooled in E-201 or heated in E-202. A granule temperature of 70° C. allows a 50/50 wt/wt mix of styrene and granules to adiabatically react to the desired exit temperature of 240° C. (compared to 360° C. for the pure monomer without the granules).

V-201 is located immediately above R-202A,B so that a rapid flow of polymer granules can occur under the force of gravity. V-201 is positioned so that the angle for the flow pipe for the polymer granules is not below 60 degrees from horizontal. These polymer granules serve two functions. They warm the initiated monomer to a temperature where propagation generates enough heat to accelerate the reaction. As adiabatic propagation proceeds to completion the polymer, as mentioned above, acts as a heat sink thus limiting the maximum temperature rise. By control of the inlet temperature of the initiated monomer and of the polymer granules the final polymer temperature is predetermined. While the reactor jacket is heated to the product discharge temperature (about 240° C.), the jacket temperature has a relatively small effect on the bulk of the polymer temperature.

The R-202A–B polymerisation cycle used for this example consists of:

Load solid polystyrene granules (15 min)

Load initiated styrene monomer (15 min)

Polymerize adiabatically (30 min)

Dump reactor (120 min)

Terminate living styryl anions on the walls by heating (60 min)

Generally it is desired to have the polymer granules added to R-201A,B to be the same molecular weight as is being produced. In normal operation, granules are saved from a previous production run. When producing a new grade of polymer, or initially starting the reactor an alternate approach needs to be used since granules of the desired molecular weight are not available.

If a different molecular weight polymer is used, several batches of "off-grade" polymer are produced. Since there is generally a ready market for off-grade polystyrene this approach may be preferred in some cases and is used in this example.

Alternately partial batches might be produced in one of the R-202 reactors with the desired molecular weight. This use of pure monomer without the heat absorbing polymer granules would require removal of some of the heat of reaction during polymerisation. Reducing the pressure and allowing some of the monomer to vaporize could accomplish this heat removal. If the target temperature were 240° C. then about 0.66 lb of styrene vapor would need to be removed for each pound of polymer. In this case, the styrene monomer would be condensed and returned to the clean styrene surge tank (R-102). Molecular weight as discussed earlier is determined only by the relative amount of NBL and styrene. In this boiling reactor case it would be necessary to control the amount of styrene monomer removed in order to control the final NBL/styrene ratio. This mode of operation would require a condenser with an auxiliary tank, piping, pump, and control system that are not included in this example.

Large gear pumps are used to transfer polymer to the devolatization section (V-302). In order to assist filling the gears, 20 psig of nitrogen pressure is occasionally applied to the reactors during transfer.

Termination of Living Polymer on Reactor Walls

If living styryl anions remain on the reactor walls they continue to grow as fresh styrene monomer is added with each subsequent batch. If this growth is allowed, the polymer on the wall reaches extremely high molecular weight. This high molecular weight polymer continues to build on the walls until it either fills the entire reactor or breaks off to produce gel particles, which are very undesirable in the product. In order to prevent this continuing molecular growth on the walls it is necessary to terminate the growing styryl anions between batches.

One technique is to briefly introduce a terminating agent such as $CO_2$. For example a mixture of nitrogen with a small amount of $CO_2$ could be introduced into a vacuum, allowed to react for a short time then a vacuum placed on the reactor followed by filling with nitrogen. While this might be acceptable it raises the question of some free $CO_2$ remaining and causing uncontrolled variation in molecular weight (by consuming some of the NBL initiator from the next batch). An alternate risk is that only the surface anions are terminated and the gel problem is not solved.

I have chosen to use thermal termination for this example since it overcomes both potential problems. It does not leave a residue of terminating agent to interfere with the next batch and it terminates the whole layer, not just the surface. When necessary, the reactor temperature is briefly increased to about 280–300° C. to cause this termination or alternately held at a lower temperature for a longer time. In addition to termination of the anions, elevated temperature tends to increase flow and thus cleans the walls of most of the polymer. Heat for perature tends to increase flow and thus cleans the walls of most of the polymer. Heat for this termination is supplied by a direct-fired Dowtherm™ boiler (F-201, not shown).

Section 300—Finishing

Termination

Methanol is utilized as the termination agent in this example. If other compounds were used for termination it is possible to have the polystyrene chains terminated with functional end groups such as carboxyl, hydroxyl, or epoxy. The methanol is added in a stoichiometric amount and blended in static mixer M-301 (such as available from the Chemineer Division of Robbins & Myers Inc.). This mixer is jacketed and includes a "cross sectional sparger" for the injection of the additive. I have chosen to add the methanol undiluted to avoid additional solvent that would have to be removed in the next step. The only by-product of termination is the trace of LiOH, which remains in the polymer.

Devolatilization

Major cost savings occur in this step (in vessel V-302) compared to free radical polystyrene. This savings occurs due to the fact that only a trace of ethylbenzene needs to be removed. The small amount and the purity of the ethylbenzene eliminate the need for any recycle. In addition several pieces of expensive equipment are eliminated. The heat exchanger normally required immediately prior to the devolatilizer is not required. Sensible heat of the polymer supplies the small heat of vaporization as the polymer is cooled slightly. In addition, pumps and tanks required to handle recycle are much smaller.

Pelletization of Polystyrene Product

Polystyrene Solid Polymer Recycle Stream

It is necessary that the polystyrene being recycled be free of water or other polar compounds that might consume NBL. Thus precautions must be taken to keep the recycle polymer "anionically clean".

I use a die to extrude 160 of strands into a water bath followed immediately with an air knife to blow liquid water from the strands. The strands then enter a cutter followed by a classifier that removes fines and oversize material. Remaining traces of water are removed during pneumatic conveying. Removal of this water is relatively simple since polystyrene absorbs only traces of water at equilibrium and there is insufficient time for significant diffusion of water into the granules.

This system is represented as S-302A,B and S-304A,B (a typical system could be obtained from The Conair Group). Removal of water is also helped by the fact that polystyrene does not have an affinity for water due to its hydrophobic nature (only 500 ppm of H2O at equilibrium at 23° C., 50% relative humidity)(ref #6)

A belt cooling system followed by a "dicer" could alternately be used and could be operated in a nitrogen atmosphere (a typical system of this type could be supplied by Sandvik Process Systems). This cooling system with its inert atmosphere would not allow water, $CO_2$ or oxygen contact but the capital cost is believed to be higher than for the more common water bath systems.

An underwater pelletizer could also alternately be used in this application. A typical system would include a 160 hole die, a tempered water system, and a centrifugal pellet dryer and could be supplied by Gala Industries, Inc. Cost of this system would be similar to that of the water bath system, it would however tend to produce more fines. This tendency would reduce the desirability of underwater pelletizing for crystal polystyrene, but not for the tougher rubber modified.

Polystyrene Product

As for the polymer recycle stream, I have chosen to use a die to extrude 160 of strands into a water bath followed immediately with an air knife to blow liquid water from the strands. The strands then enter a cutter followed by a classifier that removes fines and oversize material. Remaining traces of water are removed during pneumatic conveying to the Storage Silos with air.

Materials of Construction

All raw materials and reactants utilized in this example 1 are non-corrosive. Cleanliness of the product, however, is very important for most applications utilizing crystal polystyrene. Cleanliness considerations, therefore, rather than corrosion resistance dictates most of the materials of construction used in this example. For this reason 304 stainless steel has been utilized for all monomer or polymer contact materials of construction. This 304 specification includes the entire feed preparation section, the polymerisation section, the volatile removal, the granulation section, and the product storage equipment. In addition to the process equipment all process piping and solid conveying equipment is 304 stainless. With few exceptions, all non-product contact materials are carbon steel.

Waste Streams

The only significant waste streams associated with this process involve the feed preparation section. The flash tank (V-101) generates a stream with traces of water and 152 lb/hr of styrene. This stream is blended with condensed steam and traces of ethylbenzene from the periodic regeneration of the alumina column (C-101). These streams are decanted to separate the water and organic layers. The water stream (#5) is saturated with styrene (650 ppm at 25° C.). This stream is discharged to a chemical waste treatment plant.

Stream 16 consists of very small amounts of "floor sweepings". Other material such as un-ground "patties" may be produced while water baths or pellitizers are being switched or maintained. This material is generated during only very short stoppages and is sold as off-grade. No off-grade polymer is anticipated when switching between grades because of the batch nature. When short stoppages occur (one or two hours) polymer is accumulated in the devolatilizer (V-302). Longer stoppages in finishing equipment require a delay in batches of polymer being produced in R-202A,B.

The organic stream (#6) contains 152 lb/hr of styrene and traces of ethylbenzene used to wash the alumina beds. This stream is utilized as fuel for the Dowtherm™ heater (H-101). H-101 uses natural gas as its primary fuel, but is also equipped with a liquid fuel system to allow utilization of this mixed monomer/solvent. Heat generated by combustion of this stream has a positive, but insignificant effect on the process economics.

No Gel Formation

After six months of operation, to produce polystyrene at the design rate, there is no sign of gel formation in the polystyrene product. Gels are not visible on sensitive injection molded parts such as thin wall drinking cups. Gels are not visible in extruded sheet or in vacuum formed parts produced from this extruded sheet. Analysis of a solution of the polymer via gel permeation chromatography does not show a high molecular peak that would indicate the presence of the high molecular weight gel fraction. Analysis of scrapings from the reactor wall does not indicate the presence of polystyrene above a molecular weight of 800,000.

Example 2

Example 1 is repeated except unterminated polymer is used as the recycle stream. This modification is found to broaden the molecular weight distribution slightly. This change reduces the size of vacuum devolatilizer (V-302) to one half and eliminates half of the large gear pumps (M-302A–D). The polystyrene product is essentially gel free.

Example 3

Example 1 is repeated except the devolatilization is entirely eliminated. The product has a residue of less than 2000 ppm of ethylbenzene (which could be reduced by obtaining a lower ethylbenzene content grade of styrene monomer or switching to styrene produced by the oxidation process which coproduces propylene oxide and has no ethylbenzene residue). This change eliminates four major pieces of equipment (V-302, M-302A–D, E-301, and V-303). The polystyrene product is essentially gel free.

Example 4

A four-liter glass walled reactor with a removable stainless steel top and bottom is equipped with a propeller type agitator. The bottom of the reactor is sloped at about a 45% angle to facilitate polymer removal. An inlet for initiator shots, monomer addition, and dry nitrogen is provided. A reflux condenser is provided on an additional port with sufficient capacity to provide all of the cooling required to control the temperature. Flow from outlet at the top of the condenser can either be discharged to the atmosphere or to a vacuum pump. A control valve on the vacuum line is used to control the pressure that in turn allows for control of the temperature in the boiling reactor. Occasionally a small stream of nitrogen is introduced to improve the operation of the vacuum controller. A thermocouple is placed in another port to monitor the temperature of the polymer within the reactor. The vessel is heated with a split electric heating mantel and with electric heating elements in both the metal top and bottom of the reactor. The vessel is cooled with a split, detachable, water-cooled jacket for the initiation stage. This jacket is also used to heat slightly to start the propagation step. Once the propagation step is initiated, the heat of polymerization is removed, at nearly constant temperature, by boiling and refluxing of the monomer until a conversion of about 50 wt is reached. A small discharge gear pump is attached the bottom of the reactor Over a period of about 8 months 167 runs are made. For the initial run in this series the re-actor is prepared by being heated to a temperature of 150° C. with the electric heating mantels that covered the sides and heating elements in the stainless steel top and bottom of the reactor. Nitrogen is allowed to flow slowly through the reactor and out the reflux condenser through the night to remove all traces of water. All styrene to be used is first passed through a bed of activated alumina to remove traces of water, TBC, and other polar compounds.

For the first run the vessel is charged with 1000 g of purified monomer and cooled below 25° C. The initiator is added, with agitation, in the same proportions as in example 1 above (2.14 g of a 15 wt % NBL solution). The bright orange color of the styryl radical is seen immediately. The temperature of the water jacket is increased slowly until the reactor reaches 70° C. The jacket is maintained at this temperature while the vacuum is adjusted to allow sufficient heat removal by vaporization. Polymerization progresses with rapid boiling and when the styrene is judged to be 50% converted to polystyrene, the temperature is allowed to rise in a mode that is essentially adiabatic. The reflux condenser is closed off and nitrogen pressure in the reactor is increased to prevent any further boiling. As the temperature increases due to the evolved heat of reaction, the jacket temperature is increased to nearly match the polymer temperature. Temperature measuring points in the top and bottom of the reactor and attached to the wall are used to control the heating elements. The polymer temperature reaches a recorded temperature of 247° C. The polymer is pumped through a small static mixer as it leaves the reactor along with a stoichiometric amount of methanol, which terminates the living polymer and renders it colorless. The polymer is pumped through a stranding die and cut into granules. About 800 grams comes out relatively quickly and is saved. This polymer is found by GPC analysis to have a molecular weight of Mw=201,000 and Mw/Mn of 1.15. There is no indication of a molecular weight peak above 800,000 Mw. The polymer has a vicate softening point of 101° C. and a flexural strength of 12,600 psi. Residual styrene monomer is found to be below 20 ppm and residual ethyl benzene is 0.21 wt %. This EB amount is in agreement with the amount introduced as impurity in the original styrene plus that added with the initiator.

After most of polymer is removed, the orange like color of the living anions can be observed in the film clinging to the reactor walls. The temperature is slowly increased until this color (which is observed periodically by moving the heating mantel aside) disappears. The reactor is then cooled and maintained under a slow flow of nitrogen until the next run. The next run is usually started the next day but is sometimes repeated immediately and sometimes delayed over a weekend or holiday. As in the first run, all subsequent runs the reactor are charged with 1000 grams of styrene, temperature adjusted to below 25° C., then initiator added. Variations are made in reaction temperatures and initiator concentration (which gives corresponding variations in reaction rate and molecular weight) from run to run but thermal termination is always observed as a disappearance of the characteristic orange color of the living stryrl anions. During this entire series of runs, molecular weight is not seen to vary more than 5% from the theoretical value of 200,000 and is generally within 2% of the mean value.

Product from intermediate runs and from the final run is examined for gel formation. During this entire series of runs there is no indication of gels as indicated by roughness in the strand exiting the pumped die. A small compression molded sheet is biaxially stretched at a 4"1 ratio in both directions. On the final sample and select samples of the 167 runs there is no indication of gels in a stretched sheet. Analysis of a solution of the polymer via gel permeation chromatography does not show a high molecular peak that would indicate the presence of the high molecular weight gel fraction. Analysis of scrapings from the reactor wall does not indicate the presence of polystyrene above a molecular weight of 800,000.

Comparative Example 4

In the apparatus of example 4 the severe gel problem associated with not terminating material on the reactor wall prior to initiating the next reaction is demonstrated. In order to show the effect of not terminating thermally it is necessary to limit the reactor temperature and still have low enough viscosity to empty the reactor. To accomplish this a high level (30% in this case) of ethylbenzene solvent is employed.

As in example 4, a total of 1000 grams of total feed is added (700 g of styrene monomer and 300 g of ethylbenzene) into the reactor. The mixture is first cleaned by passing through activated alumina. The reactor and contents is then cooled to below 25° C. The initiator is added, with agitation, in the same proportions as in example 1–4 above. The bright orange color of the styryl radical is seen immediately. The temperature of the water jacket is increased slowly until the reactor reaches 70° C. The jacket is maintained at this temperature by the vacuum that is adjusted to allow sufficient heat removal by vaporization. When the styrene is judged to be completely reacted, the reactor is dumped, and terminated with methanol during dumping, as in example 4. The product is placed into a vacuum oven for one hour where it is heated to 210° C. at 10 mm pressure to remove the ethylbenzene.

The reactor walls retain a slight orange color indicating the presence of a small amount of living stryrl anions remain. The reactor is immediately cooled to 25° C., reloaded and the reaction repeated. After 27 repeats it is noted that there is an accumulation of gel-like material on both the agitator and walls. When the devolatilized product is compression molded and biaxially stretched a large number of visible gels are observed in the film. The film resembles sand paper due to the multiple gels. The GPC output shows a broad peak above 800,000 Mw. The product would not be marketable.

Example 5

Comparative example 4 is repeated except prior to initiation, at below 25° C., the monomer solvent mix is violently agitated so as to spray the entire inside of the reactor and remove the film of styryl anions from the wall and disperse them uniformly throughout the reactor charge. This is done before heating to initiate propagation. After 27 repeats there is no sign of any kind of build-up on the reactor walls or on the agitator. When the devolatilized product is compression molded and biaxially stretched, no visible gels are observed in the film. The film is smooth to the touch. The GPC output shows no peak above 800,000 Mw, but does show a very slight "bump" on the high molecular weight end of the GPC chromatograph. This bump is apparently due to the styryl anions from the walls of the previous batch being allowed to grow to approximately double the average length. The product is prime grade polystyrene.

Inoperable Example 6

Figure 2:
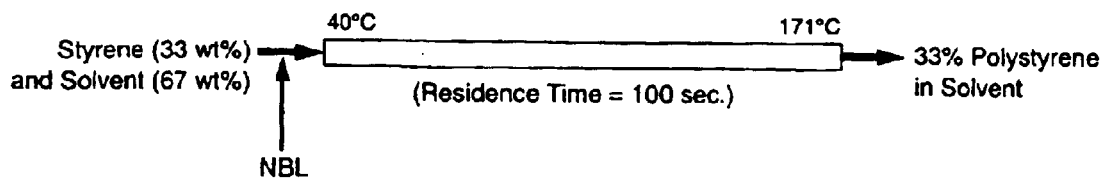

Conditions for carrying out the process of the first example of U.S. Pat. No. 5,717,040 are duplicated. The only difference is that the time of the example is extended as would be necessary for industrial practice. As illustrated in FIG. 2 a reactor having a length of 40 m and a diameter of 0.2 m is used. The first 2 m and the final 20 m are equipped with mixing elements. A solution of styrene in ethylbenzene is fed in at a rate of 750 l/min at the reactor inlet. The concentration of styrene is 32.5%. A 0.0014 molar sec-butyllithium solution in ethylbenzene is fed in separately at the same point. The temperature is seen to increase from 40 to about 171° C. The conversion of styrene to polystyrene is 100%.

After many days of operation material is collected and devolatilized in a vacuum oven. The exceptionally high solvent level makes devolatilization more difficult. When the devolatilized product is compression molded and biaxially stretched a large number of visible gels are observed in the film. The film is rough and resembles sand paper due to the multiple gels. The GPC output shows a second broad and smaller peak at a much higher Mw then the bulk of the product. The product would not be marketable.

Inoperable Example 7

Figure 3:
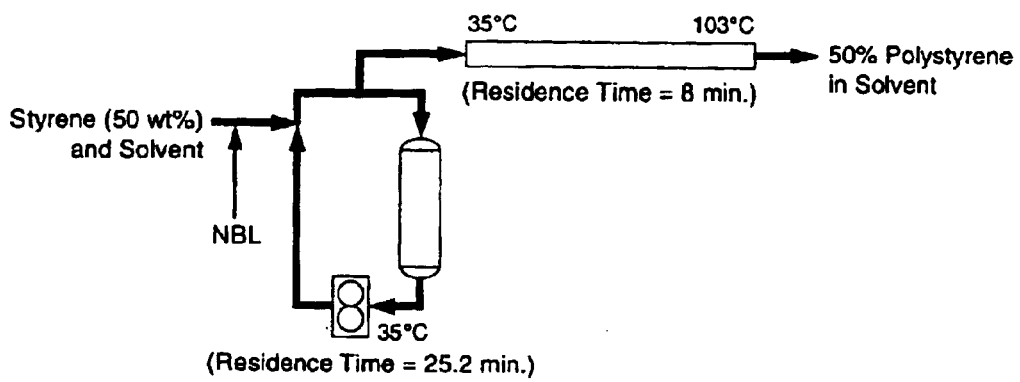

Conditions for carrying out the process of the first example of U.S. Pat. No. 5,902,865 are duplicated. The only difference is that the operating time of the example is extended as would be necessary for industrial practice. As illustrated in FIG. 3, a circulating reactor is made up with a circulation pump with two individual tubes each having a length of 4 m and a diameter of 5 cm which are equipped with Kenics mixers together with a smaller mixing section for mixing-in of the feeds of monomer or initiator solution. This recirculating reactor is jacketed and has a large cooling area of more than 50 m$^2$ per m$^3$ of reactor volume, which allows for essentially isothermal polymerization in this recirculating section.

After the circulating reactor the material flows through a tube reactor. The tube reactor is fitted with Kenics mixers to ensure plug flow. A feed stream composed of styrene (at 4.0 kmol/m$^3$) and NBL initiator (at 2.2 mol/m$^3$) in cyclohexane solvent is introduced at a rate such that the residence time in the circulating reactor is 25.2 minutes. The mean temperature in the circulating reactor is maintained at 35° C. The circulation ratio is 15.3. Partially polymerized material having a polymer mass fraction of 0.31 is forwarded to the tubular reactor section where the remaining styrene polymerizes in a near adiabatic mode increasing the exit temperature to 103° C. and the polymer mass fraction to about 50%.

After a few days of operation material is collected and devolatilized in a vacuum oven. Devolatilization is seen to be more difficult due to the relatively high solvent level. When the devolatilized product is compression molded and biaxially stretched a large number of visible gels are observed in the film. The film is rough and resembles sand paper due to the multiple gels. The GPC output shows a major narrow peak at an Mw of about 230,000 with second broader but smaller peak at a much higher Mw. Devolatilization and handling of the larger volume of recycle is more difficult and the large number of gels would make the product difficult to market.

Inoperative Example 8

Figure 4:
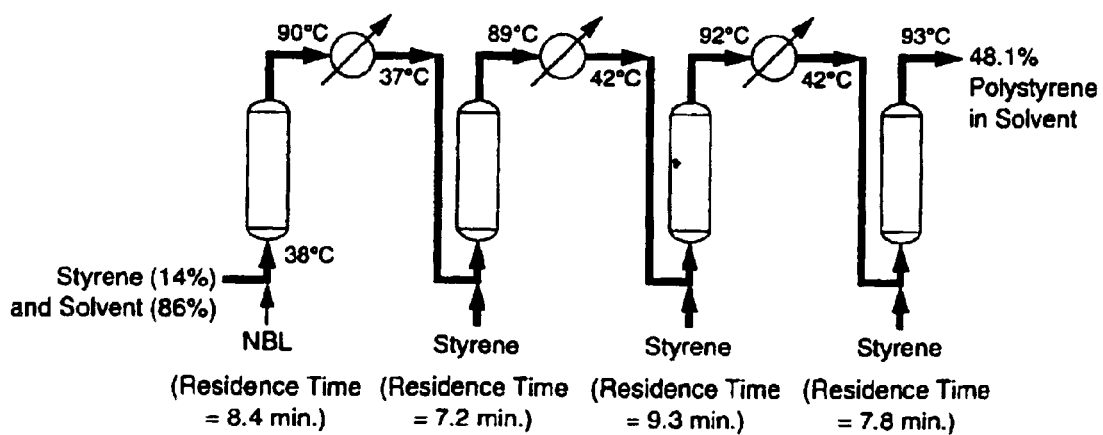

Conditions for carrying out the process of the first example of U.S. Pat. No. 5,391,665 are duplicated. The only difference is that the operating time of the example is extended as would be necessary for industrial practice. As illustrated in FIG. 4, four tubular reactors each of length 10 m are provided, the first two having a diameter of 50 mm and the second two having a diameter of 62 mm. Three heat exchangers are placed between each of the four reactors, which are connected in series. A feed mixture composed of 108 kg/hour of cyclohexane, 355 ml/hour of a 12% solution of sec-butyllithium in cyclohexane and 118 kg/hour of styrene at a temperature of 38° C. Adiabatic reaction in the first reactor increased the temperature to 90° C. Between the first and second reactor the stream is cooled to 37° C. and an additional 22 kg/hour of styrene monomer is added. Adiabatic polymerization in the second reactor increases the outlet temperature to 89° C. Before the third stage the stream is cooled and styrene (27 kg/hour) is added for a feed temperature to the third stage of 42° C. Adiabatic polymerization in the third stage increases the outlet temperature to 92° C. This stream is cooled and more styrene (33 kg/hour) is added for a feed temperature of 42° C. to the fourth reactor. Adiabatic polymerization in the fourth stage increases the outlet temperature to 93° C. This stream has a weight fraction of polymer of 0.48 and a weight average degree of polymerization of 2050 (or Mw=213,000) with a very narrow distribution.

After a several days of operation, material is collected and devolatilized in a vacuum oven. Devolatilization is seen to be more difficult due to the relatively high solvent level. When the devolatilized product is compression molded and biaxially stretched a large number of visible gels are observed in the film. The film is rough and resembles sand paper due to the multiple gels. The GPC output shows a major narrow peak at an Mw of about 213,000 with second broader and smaller peak at a much higher Mw. Devolatilization and handling of the larger volume of recycle is more difficult and the large number of gels would make the product difficult to market.

Inoperative Example 9

Figure 5:
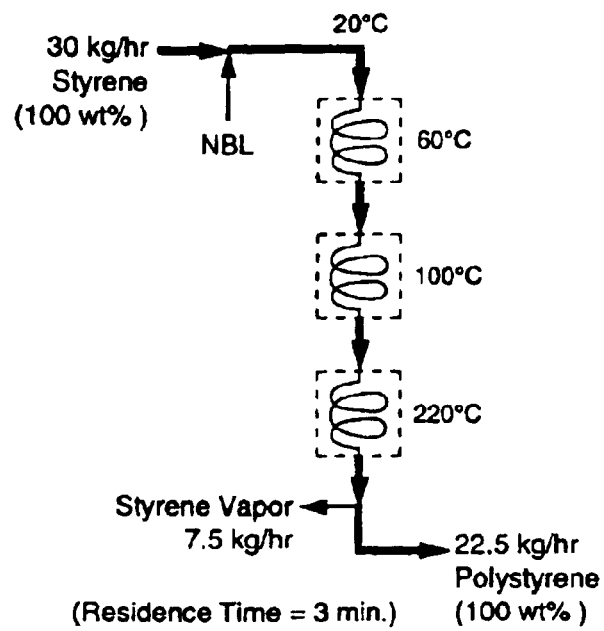

Conditions for carrying out the process of the polystyrene example of U.S. Pat. No. 4,200,713 are duplicated. The only difference is that the operating time of the example is extended as would be necessary for industrial practice. As illustrated in FIG. 5, 30 kg/hr of a mixture of 99 wt % styrene and 1 wt % THF along with 195 millimol/hour of butyllithium (1 molar in hexane) were introduced, at 20° C. and 6.4 bar pressure into an 18 m coil with a 17 mm inside diameter. The first 6 m section was maintained at 60° C., the second at 100° C., and the final 6 m at 220° C. (wall). Out-let pressure of 0.7 bar encouraged boiling within the reactor.

After a very few days of operation material is collected and the small amount of residual styrene removed in a vacuum oven. When the devolatilized product is compression molded and biaxially stretched a large number of visible gels are observed in the film. The film is rough and resembles sand paper due to the multiple gels. The large number of gels would make the product difficult to market.

Inoperative Example 10

Figure 6:
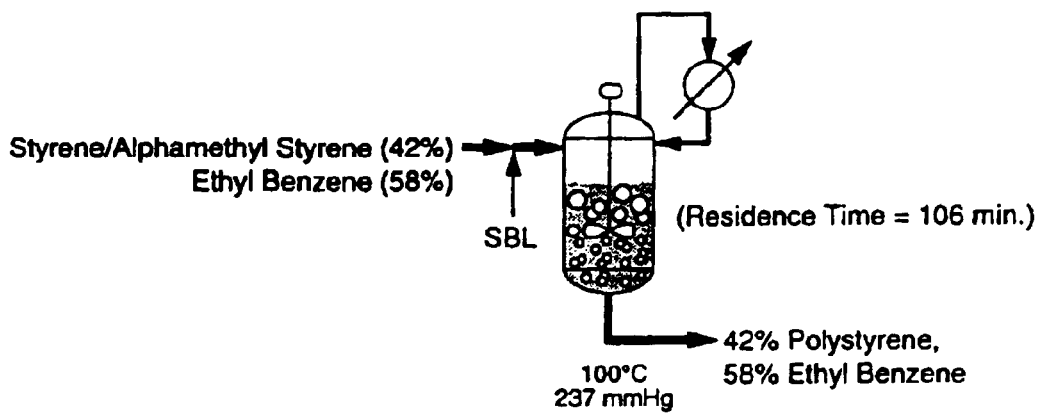
Figure 7:
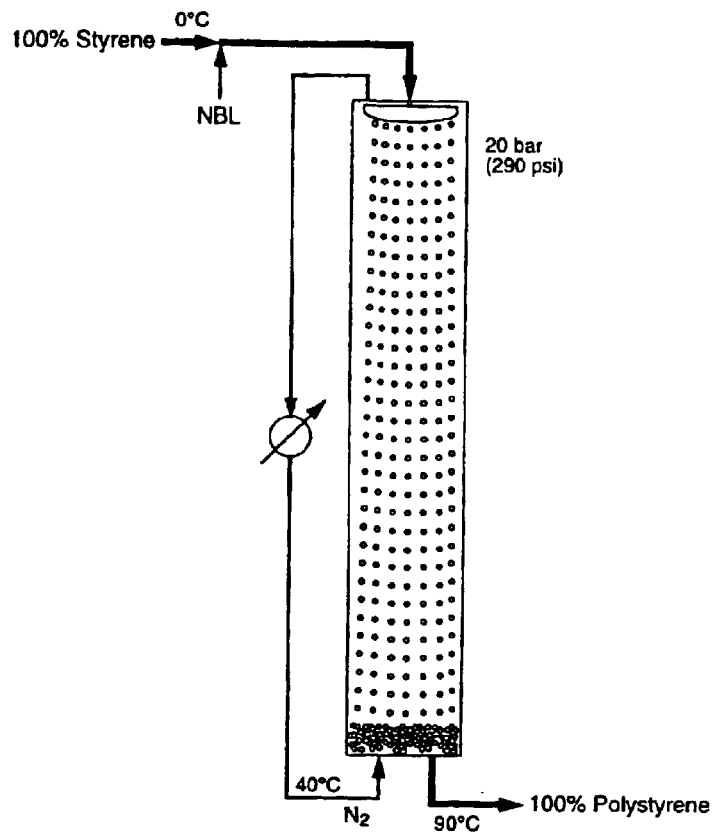

Conditions for carrying out the process of the third example of U.S. Pat. No. 4,725,654 are duplicated. The only difference is that the operating time of the example is extended as would be necessary for industrial practice. As illustrated in FIG. 6, an agitated boiling 500 gal reactor is mounted on load cells so that the contents can be maintained at a constant weight of 1500 lb. A 42 wt % solution of styrene in ethylbenzene is passed through a molecular sieve bed then into the reactor at a rate of 850 lb/hr along with a stream of normal-butyllithium at 80 ppm of total feed. The reactor is maintained at a pressure of 237 mm Hg where heat removal by boiling maintains the temperature at 100° C.

After many days of operation material is collected, terminated with ethanol, and devolatilized in a vacuum oven. Devolatilization is seen to be more difficult due to the relatively high solvent level. When the devolatilized product is compression molded and biaxially stretched a large number of visible gels are observed in the film. The film is rough and resembles sand paper due to the multiple gels. The GPC output shows a major peak at an Mw of about 195,000 with second broader peak at a much higher Mw. Devolatilization and handling of the larger volume of recycle is more difficult and the large number of gels would make the product difficult to market.

Inoperative Example 11

Figure 8:
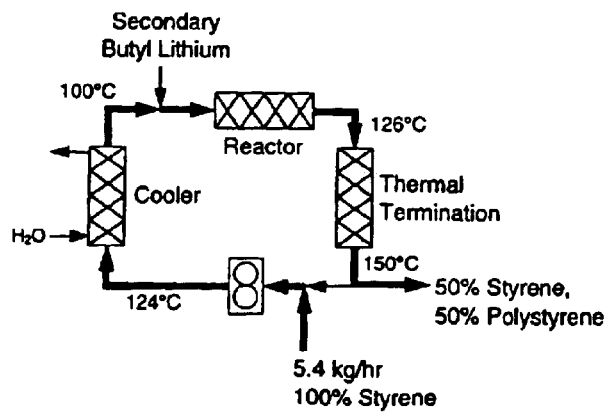
Figure 9:
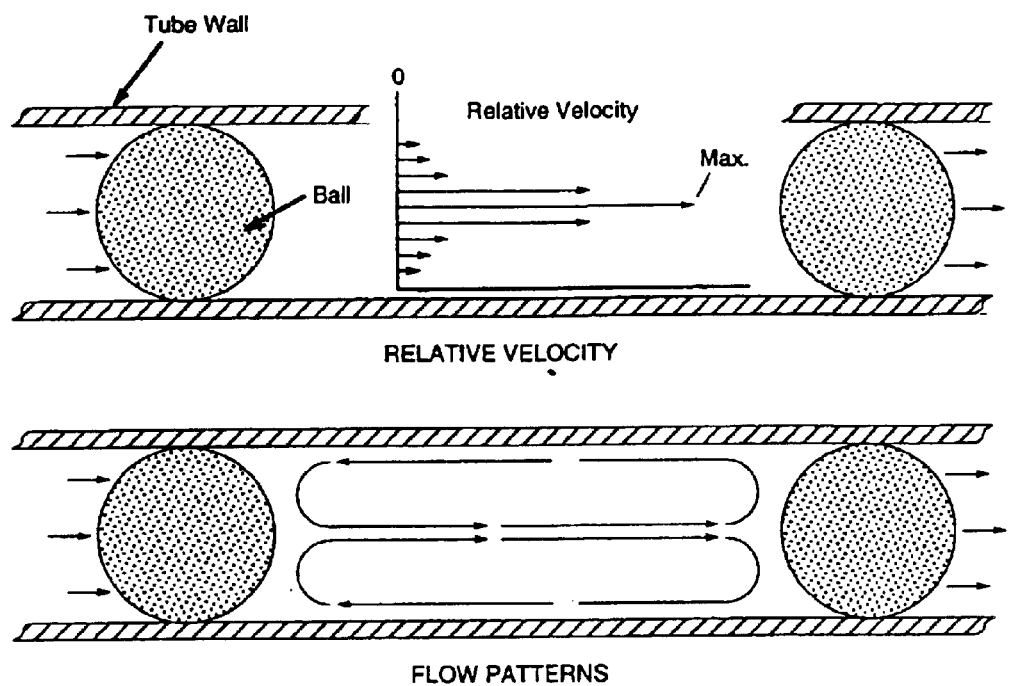

Conditions for carrying out the process of the embodiment of U.S. Pat. No. 5,602,216 are duplicated. As illustrated in FIG. 8, a circulating reactor is made up with a circulation pump with three Sulzer mixing elements.

An attempt is made to start the reaction by filling the reactor with recirculating styrene monomer then adding 5.4 kg/hr of pure styrene then adding the secondary butyllithium after the cooler. The reaction proceeds rapidly and out of control. High levels of polymer in the recirculation lines quickly become too thick to pump and the experiment cannot be continued.

The reactor is cleaned and the experiment is continued with a 50/50 by wt mixture of styrene and ethylbenzene, which serves to demonstrate the lack of utility of the U.S. Pat. No. 5,602,216 reactor configuration.

After a few days of operation material is collected and devolatilized in a vacuum oven. When the devolatilized product is compression molded and biaxially stretched a large number of visible gels are observed in the film. The film is rough and resembles sand paper due to the multiple gels. The GPC output shows a very broad distribution with a smaller peak at a much higher Mw. The large number of gels makes the product difficult to market.

Example 12

As in example 4 except a six-liter glass walled reactor with a removable stainless steel top and bottom is equipped with a propeller type agitator. The bottom of the reactor is sloped at about a 45% angle to facilitate polymer removal. An inlet for initiator shots, monomer addition, and dry nitrogen is provided. A reflux condenser is provided on an additional port with sufficient capacity to provide all of the cooling required to control the temperature. Flow from outlet at the top of the condenser can either be discharged to the atmosphere or to a vacuum pump. A control valve on the vacuum line is used to control the pressure that in turn allows for control of the temperature in the boiling reactor. Occasionally a small stream of nitrogen is introduced to improve the operation of the vacuum controller. A thermocouple is placed in another port to monitor the temperature of the polymer within the reactor. The vessel is heated with a split electric heating mantel and with electric heating elements in both the metal top and bottom of the reactor. The vessel is cooled with a split, detachable, water-cooled jacket for the initiation stage. This jacket is also used to heat slightly to start the propagation step. Once the propagation step is initiated, the heat of polymerization is removed, at nearly constant temperature, by boiling and refluxing of the monomer until a conversion of about 50 wt % is reached. A small discharge gear pump is attached the bottom of the reactor Over a period of about 8 months 167 runs are made. For the initial run in this series the reactor is prepared by being heated to a temperature of 150° C. with the electric heating mantels that covered the sides and heating elements in the stainless steel top and bottom of the reactor. Nitrogen is allowed to flow slowly through the reactor and out the reflux condenser through the night to remove all traces of water. All styrene to be used is first passed through a bed of activated alumina to remove traces of water, TBC, and other polar compounds.

For the first run the vessel is charged with 1000 g of purified monomer and cooled below 25° C. The initiator is added, with agitation, in the same proportions as in example 1 above (2.14 g of a 15 wt % NBL solution). The bright orange color of the styryl radical is seen immediately. The temperature of the water jacket is increased slowly until the reactor reaches 55° C. The jacket is maintained at this temperature while the vacuum is adjusted to allow sufficient heat removal by vaporization. Polymerization progresses with rapid boiling and when the styrene is judged to be 50% converted to polystyrene, the temperature is allowed to rise in a mode that is essentially adiabatic. The reflux condenser is closed off and nitrogen pressure in the reactor is increased to prevent any further boiling. As the temperature increases due to the evolved heat of reaction, the jacket temperature is increased to nearly match the polymer temperature. Temperature measuring points in the top and bottom of the reactor and attached to the wall are used to control the heating elements. The polymer temperature reaches a recorded temperature of 247° C. The polymer is pumped through a small static mixer as it leaves the reactor along with a stoichiometric amount of methanol, which terminates the living polymer and renders it colorless. The polymer is pumped through a stranding die and cut into granules. About 800 grams comes out relatively quickly and is saved. This polymer is found by GPC analysis to have a molecular weight of Mw=201,000 and Mw/Mn of 1.15. There is no indication of a molecular weight peak above 800,000 Mw. The polymer has a vicate softening point of 101° C. and a flexural strength of 12,600 psi. Residual styrene monomer is found to be below 20 ppm and residual ethyl benzene is 0.21 wt %. This EB amount is in agreement with the amount introduced an impurity in the original styrene plus that added with the initiator.

After most of polymer is removed, the orange like color of the living anions can be observed in the film clinging to the reactor walls. The temperature is slowly increased until this color (which is observed periodically by moving the heating mantel aside) disappears. The reactor is then cooled and maintained under a slow flow of nitrogen until the next run. The next run is usually started the next day but is sometimes repeated immediately and sometimes delayed over a weekend or holiday. As in the first run, all subsequent runs the reactor are charged with 1000 grams of styrene, temperature adjusted to below 25° C., then initiator added. Variations are made in reaction temperatures and initiator concentration (which gives corresponding variations in reaction rate and molecular weight) from run to run but thermal termination is always observed as a disappearance of the characteristic orange color of the living stryrl anions. During this entire series of runs, molecular weight is not seen to vary more than 5% from the theoretical value of 200,000 and is generally within 2% of the mean value.

Product from intermediate runs and from the final run is examined for gel formation. During this entire series of runs there is no indication of gels as indicated by roughness in the strand exiting the pumped die. A small compression molded sheet is biaxially stretched at a 4"1 ratio in both directions. On the final sample and select samples of the 167 runs there is no indication of gels in a stretched sheet. Analysis of a solution of the polymer via gel permeation chromatography does not show a high molecular peak that would indicate the presence of the high molecular weight gel fraction. Analysis of scrapings from the reactor wall does not indicate the presence of polystyrene above a molecular weight of 800,000.

Literature References

1. Schwarc, M., Progress in Reaction Kineticss, P 218–284, Vo. 2, Portere, G., ed Pergamon Press, Macmillan, N.Y., 1964
2. Worsfold, D. J., et al, Can. J. Chem., V 38, #10, 1960
3. Roovers, J. E. L., et al, Macromolecules, V 8, #3, May–June 1975
4. Morton, M., et al, J of Poly. Sci. Part A, V1, P 461–474, 1963
5. Schwartz, M., "Carbanions, etc., Wiley-Interscience, N.Y. 1968
6. Moore, E. R., ED, Styrene Polymers Section, Ency. Poly. Sci. & Eng., V 16 P 1–246, John Wiley & Sons 1989
7. Crowder, M. I., et al, Poly. Eng. & Sci., Mid October 1994, V 34, #19, p 1497
8. Kim, Dong-Min, et al, Ind. Eng. Chem. Res. 38, #5, 1856–1862, 1999
9. Anon., Research Disclosure, "Star Branched Polymers etc." 1990
10. Moore, E. R. "Significance of the Gel Point etc.", PhD Thesis, Case West. Res. U., 1962
11. Hirao, A., et al, Macromolecules, V. 26, #9, Apr. 26, 1993
12. Priddy et al, JAPS, 40, 41–45 1990
13. Kern, W. J., et al, JAPS, V 16, #12, P 23–3131, 1972
14. Kern, W. J., Preprint, Div of Poly. Chem, ACS, V 12, #1, 1971
15. Quirk, Roderic P., et al, Macromolecules, V 22, 85–90, 1989
16. Morton, M., et al, JAPS, Part C, #1, 311–323, 1963
17. Welch, F. J., J. Am. Chem. Soc., v 81, p1345, 1959
18. Worsfold, et al, Macromolecules, V 5, #4, p393, July–August 1972
19. Kim, H. J., et al, Korean Polymer Journal, V 7, #1, 64–71, 1999
20. Anon., Chemetall Informational Brochure, "Handling of Butyllithium", 1993

I claim:

1. A batch process for preparation of anionic initiated polystyrene comprising:
    a. placing commercial grade styrene monomer with no added solvent into an initiation reactor,
    b. initiation of that styrene monomer below 25 degrees C.,
    c. addition of solid particulate polystyrene to a polymerization reactor,
    d. adding the initiated styrene monomer to that polymerization reactor
    e. allowing polymerization to proceed adiabatically to essential completion producing an essentially gel free product consisting of at least 99 wt % polymer,
    f. removing molten polymer from the polymerization reactor
    g. terminating all remaining anions in the polymerization reactor
    h. repeating steps (a) to (g) multiple times.

2. The process of claim 1 wherein the anionic initiator is an organolithium compound.

3. The process of claim 2 wherein the anionic initiator is n-butyl lithium.

4. The process of claim 1 wherein the final polymer temperature is between 220 degrees C. and 260 degrees C.

5. The process of claim 1 wherein a portion of the polymer produced is set aside and used as the solid particulate polystyrene for subsequent runs.

6. The process of claim 1 wherein living anions remaining in the reactor are terminated prior to addition of the next reaction batch to produce an essentially gel free polymer.

7. The process of claim 6 wherein living anions remaining in the reactor are thermally terminated prior to addition of the next reaction batch.

8. The process of claim 6 wherein color is used to confirm that termination is complete.

9. The process of claim 1 wherein initiation takes place below 10 degrees C.

10. The essentially gel free polystyrene product produced by the process of claim 1.

11. The process of claim 1 wherein further removal of volatile compounds under vacuum is not carried out prior to commercial utilization of the polymer product.

12. The process of claim 1 wherein the final polymer temperature is between 180 degrees C. and 290 degrees C.

13. A batch process for preparation of anionic initiated polystyrene comprising:
    a. placing commercial grade styrene monomer with no added solvent into a polymerization reactor,
    b. initiation of this styrene monomer at below 25 degrees C.,
    c. maintaining polymerization temperature below 70 degrees C. until polymerization reaches a desired level,
    d. allowing polymerization to proceed adiabatically to essential completion producing an essentially gel free product consisting of at least 99 wt % polymer,
    e. removing all living anions from surfaces within the reactor
    f. repeating steps (a) to (e) multiple times.

14. The process of claim 13 wherein the anionic initiator is an organic lithium compound.

15. The process of claim 14 wherein the anionic initiator is n-butyl lithium.

16. The process of claim 13 wherein polymer made at or below 70 degrees C. is produced in such quantity that the final polymer temperature after adiabatic polymerization of the remaining styrene monomer is between 180 degrees C. and 290 degrees C.

17. The process of claim 13 wherein the low temperature polymer is produced in such quantity that the final polymer temperature after adiabatic polymerization is between 220 degrees C. and 260 degrees C.

18. The process of claim 13 wherein living anions remaining in the reactor are terminated prior to addition of the next reaction batch.

19. The process of claim 13 wherein living anions remaining in the reactor are terminated thermally prior to addition of the next reaction batch.

20. The process of claim 13 wherein living anions remaining in the reactor are terminated chemically prior to addition of the next reaction batch.

21. The process of claim 13 wherein boiling is used to control the initial polymerization temperature below 70 degrees C.

22. The process of claim 18 wherein color is used to confirm that termination is complete.

23. The process of claim 13 wherein the ethylbenzene content of the commercial grade polystyrene shall not exceed 0.2 wt %.

24. The process of claim 13 wherein gel formation in the product is retarded or completely eliminated by washing the reactor at a temperature below 25 degrees C. with the next batch of monomer prior to polymerization.

25. The essentially gel free product produced by the process of claim 13.

26. The process of claim 13 wherein further removal of volatile compounds under vacuum is not carried out prior to commercial utilization of the polymer product.

27. The essentially gel free product produced by the process of claim 24.

28. The essentially gel free product produced by the process of claim 7.

* * * * *